United States Patent
Koda et al.

(10) Patent No.: US 11,895,285 B2
(45) Date of Patent: Feb. 6, 2024

(54) INFORMATION PROCESSING APPARATUS, IMAGE FORMING SYSTEM, METHOD FOR CONTROLLING DISPLAY, AND NON-TRANSITORY RECORDING MEDIUM

(71) Applicants: Shunsuke Koda, Kanagawa (JP); Akiko Bamba, Tokyo (JP); Kanako Hirasawa, Kanagawa (JP)

(72) Inventors: Shunsuke Koda, Kanagawa (JP); Akiko Bamba, Tokyo (JP); Kanako Hirasawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/960,905

(22) Filed: Oct. 6, 2022

(65) Prior Publication Data
US 2023/0144579 A1  May 11, 2023

(30) Foreign Application Priority Data
Nov. 8, 2021 (JP) ................... 2021-182016

(51) Int. Cl.
*H04N 1/60* (2006.01)
*H04N 1/00* (2006.01)

(52) U.S. Cl.
CPC ......... *H04N 1/6052* (2013.01); *H04N 1/0044* (2013.01); *H04N 1/00816* (2013.01); *H04N 1/00824* (2013.01)

(58) Field of Classification Search
CPC ............... H04N 1/6052; H04N 1/0044; H04N 1/00816; H04N 1/00824; H04N 1/00411; H04N 1/00442; H04N 1/6055; H04N 1/6047

See application file for complete search history.

(56) References Cited

U.S. PATENT DOCUMENTS

| | | | |
|---|---|---|---|
| 2004/0114165 A1 | 6/2004 | Nakajima | |
| 2015/0268098 A1* | 9/2015 | Minchew | G01J 3/526 345/594 |
| 2019/0297226 A1* | 9/2019 | Ohkubo | H04N 1/00045 |
| 2020/0213477 A1 | 7/2020 | Hirano | |
| 2021/0084195 A1* | 3/2021 | Yamaguchi | H04N 1/6002 |

FOREIGN PATENT DOCUMENTS

| | | |
|---|---|---|
| JP | 2004-135312 | 4/2004 |
| JP | 2020-107982 | 7/2020 |

OTHER PUBLICATIONS

Extended European Search Report dated Mar. 30, 2023 issued in corresponding European Appln. No. 22201800.4.

* cited by examiner

*Primary Examiner* — Iriana Cruz
(74) *Attorney, Agent, or Firm* — Harness, Dickey & Pierce, P.L.C.

(57) ABSTRACT

An information processing apparatus includes a display and circuitry. The circuitry controls the display to display a first display field for displaying a first image of document data, a second display field for displaying a second image based on a first data generated by an image reading device reading a print sample, a third display field for displaying a third image based on a second data generated by the image reading device reading a printed matter printed out by an image forming apparatus based on the document data, and a fourth display field for displaying a fourth image after execution of color matching for color of the third image to be matched with color of the second image based on the document data.

8 Claims, 15 Drawing Sheets

INFORMATION PROCESSING APPARATUS, IMAGE FORMING SYSTEM, METHOD FOR CONTROLLING DISPLAY, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application No. 2021-182016, filed on Nov. 8, 2021, in the Japan Patent Office, the entire disclosure of which is hereby incorporated by reference herein.

BACKGROUND

Technical Field

The present disclosure relates to an information processing apparatus, an image forming system, a method for controlling a display, and a non-transitory recording medium.

Related Art

Adjusting color reproducibility of a printer to be used for a print job to reproduce color of a printed matter printed by a particular printer (a same printer in a past state or an ideal printer) or color of a print sample such as a book already existing as a printed matter is highly specialized and requires complex work. For example, in order to reproduce color of a printed matter specified by a customer, a person having a color management skill checks each operation one by one and adjusts color reproducibility of a printer to print out a printed matter whose color is approximated to the color of the printed matter specified by the customer. However, a printing company that lacks sufficient personnel having such a color management skill is unable to receive such kind of business order from the customer. In addition, in order to achieve such color reproducibility of the printer to reproduce the color of the printed matter printed by the particular printer or the color of the print sample such as the book already existing as a printed matter, it is necessary to adjust a color profile.

There is known a technique for adjusting the color reproducibility of a printer using an image processing apparatus. The image processing apparatus includes a feature value conversion unit, a past history storage unit, a calculation unit, and a profile update unit. The feature value conversion unit performs color conversion of input data. The past history storage unit stores past history information on measurement of a color chart including a conversion value of a measured value of the color chart. The calculation unit compares the past history information stored in the past history storage unit with information on newly input measurement of another color chart to determine the number of color patches based on a result of the comparison. The profile update unit updates a printer profile based on data obtained by reading a determined color chart and stores the printer profile in the past history storage unit.

In a related art, achieving such color reproducibility described above largely depends on levels of the color management skill of skilled persons. In the first place, such color reproducibility is not achieved without a skilled person. Even if such a skilled person exists, there is an issue that a result of color reproduction varies depending on the level of the color management skill of the skilled person.

SUMMARY

In one aspect, an information processing apparatus includes a display and circuitry. The circuitry controls the display to display a first display field for displaying a first image of document data, a second display field for displaying a second image based on a first data generated by an image reading device reading a print sample, a third display field for displaying a third image based on a second data generated by the image reading device reading a printed matter printed out by an image forming apparatus based on the document data, and a fourth display field for displaying a fourth image after execution of color matching for color of the third image to be matched with color of the second image based on the document data.

In another aspect, an image forming system includes the image reading device, the image forming apparatus, and the information processing apparatus.

In another aspect, a method for controlling a display includes displaying a first image of document data in a first display field, displaying a second image in a second display field based on a first data generated by an image reading device reading a print sample, displaying a third image in a third display field based on a second data generated by the image reading device reading a printed matter printed out by an image forming apparatus based on the document data, and displaying a fourth image after execution of color matching for color of the third image to be matched with color of the second image based on the document data in a fourth display field.

In another aspect, a non-transitory recording medium carries computer readable codes for controlling a computer system to perform a method. The method includes displaying a first image of document data in a first display field, displaying a second image in a second display field based on a first data generated by an image reading device reading a print sample, displaying a third image in a third display field based on a second data generated by the image reading device reading a printed matter printed out by an image forming apparatus based on the document data, and displaying a fourth image after execution of color matching for color of the third image to be matched with color of the second image based on the document data in a fourth display field.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
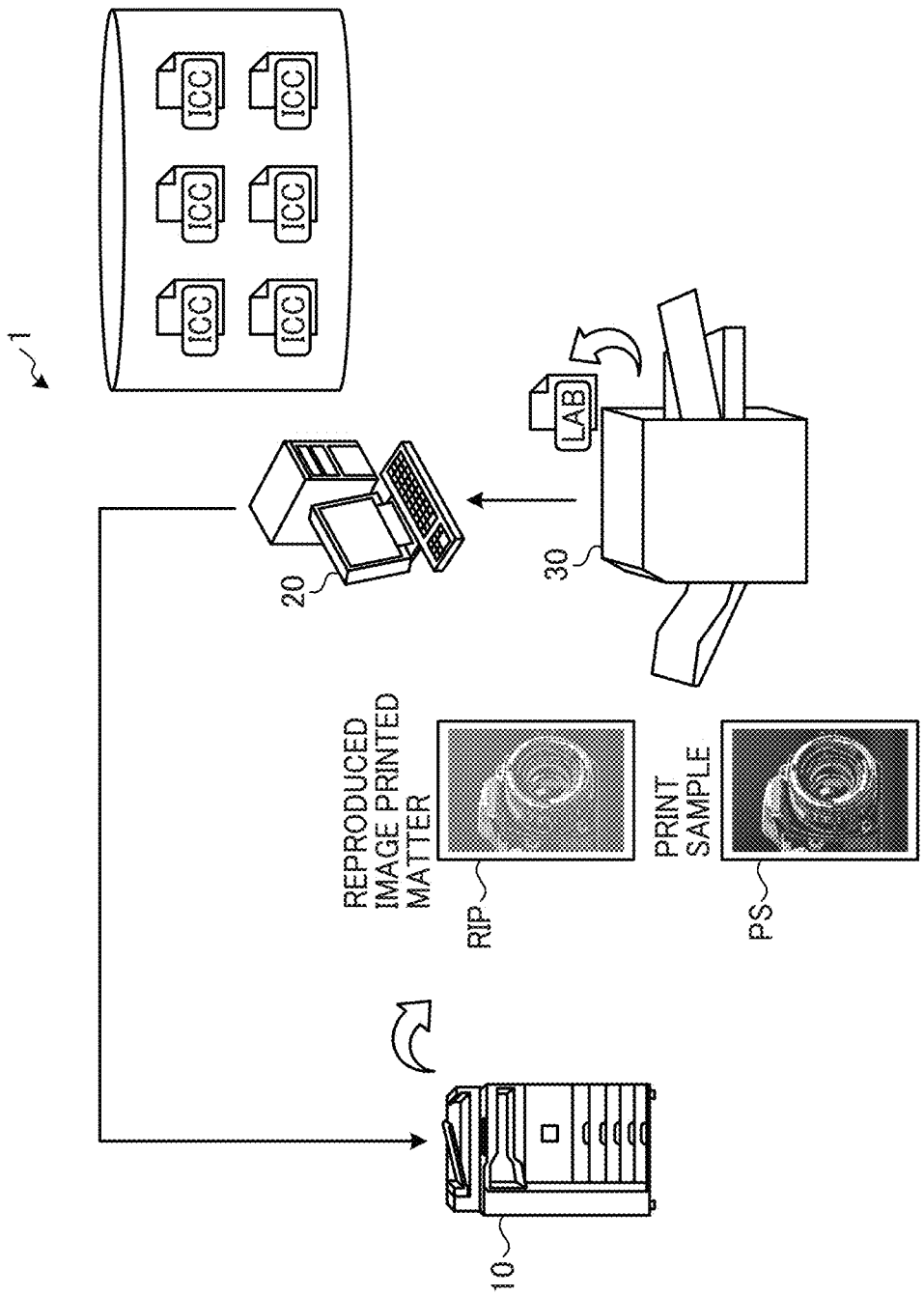
FIG. 1 is a schematic diagram illustrating an example of an overall configuration of an image forming system according to one embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, descriptions are given in detail of an information processing apparatus, an image forming system, a method for controlling a display, and a non-transitory recording medium according to embodiments of the present disclosure with reference to the drawings. The present disclosure, however, is not limited to the following one or more embodiments, and the constituent elements of the following one or more embodiments include elements that may be easily conceived by those skilled in the art, those being substantially the same ones, and those being within equivalent ranges. Furthermore, various omissions, substitutions, changes, and combinations of the constituent elements may be made without departing from the gist of the following one or more embodiments.

Overall Configuration of Image Forming System

FIG. 1 is a schematic diagram illustrating an example of an overall configuration of an image forming system according to the present embodiment. A description is given of an overall configuration of an image forming system 1 according to the present embodiment with reference to FIG. 1.

The image forming system 1 illustrated in FIG. 1 is an information processing system that enables efficient color matching for an image forming apparatus by using a print sample. As illustrated in FIG. 1, the image forming system 1 includes an image forming apparatus 10, an information processing apparatus 20, and an image reading device 30. Each apparatus or device included in the image forming system 1 performs data communication with one another via a network (for example, a network N illustrated in FIG. 4 to be described later).

The image forming apparatus 10 is an image forming apparatus such as a multifunction peripheral (MFP) for which color matching processing is executed. Note that the MFP is a multifunction peripheral having at least two of a copying function, a printing function, a scanning function, and a facsimile communication function. The image forming apparatus 10 executes printing processing using an international color consortium (ICC) profile (hereinafter simply referred to as a profile) generated as a result of the color matching processing executed by the information processing apparatus 20.

Note that the image forming apparatus 10 is not limited to the MFP, and may be, for example, an ordinary electrophotographic printing apparatus or an inkjet printing apparatus having a printing function as a main function, or a commercial printing apparatus controlled by a digital front end (DFE). In the present embodiment, the image forming apparatus 10 is described as an MFP.

The information processing apparatus 20 is an information processing apparatus, such as a personal computer (PC) or a workstation, which holds document data to be printed out by the image forming apparatus 10 and transmits the document data to the image forming apparatus 10 when the color matching processing is executed for the image forming apparatus 10. In addition, the information processing apparatus 20 displays a screen that presents an image of the document data, an image of the print sample, an image of a printed matter printed out by the image forming apparatus 10 based on the document data (hereinafter sometimes referred to as a reproduced image printed matter) (e.g., a reproduced image printed matter RIP illustrated in FIG. 1), and an image after color matching, in order to execute color matching by using read data of the reproduced image printed matter and the print sample read by the image reading device 30. The information processing apparatus 20 generates a profile by executing the color matching for the image forming apparatus 10 and transmits the profile to the image forming apparatus 10. Then, the image forming apparatus 10 performs print output using the profile received from the information processing apparatus 20.

A program for controlling display operation of the screen that presents each image displayed by the information processing apparatus 20 for executing the above-described color matching may be a native application executed on the information processing apparatus 20, or may be a web application whose functionality is provided by a web server or a cloud server.

The image reading device 30 executes reading processing on the reproduced image printed matter printed out by the image forming apparatus 10 to generate the read data including colorimetric values such as L*a*b* values, XYZ values, or RGB values. The image reading device 30 transmits the read data to the information processing apparatus 20. Examples of the image reading device 30 include, but are not limited to, devices such as an image scanner and a colorimeter, and include any device having a function of acquiring the read data of the print sample and the reproduced image printed matter. In the present embodiment, the colorimetric values of the read data obtained by the reading processing executed by the image reading device 30 are described as L*a*b* values of the L*a*b* colorimetric system (hereinafter simply referred to as "Lab values"). The read data obtained by the reading processing executed by the image reading device 30 are not limited to colorimetric values such as Lab values. The image reading device 30 may transmit the read data as raw data to the information processing apparatus 20 so that the information processing apparatus 20 converts the raw data into the colorimetric values.

Hardware Configuration of Image Forming Apparatus

Figure 2:
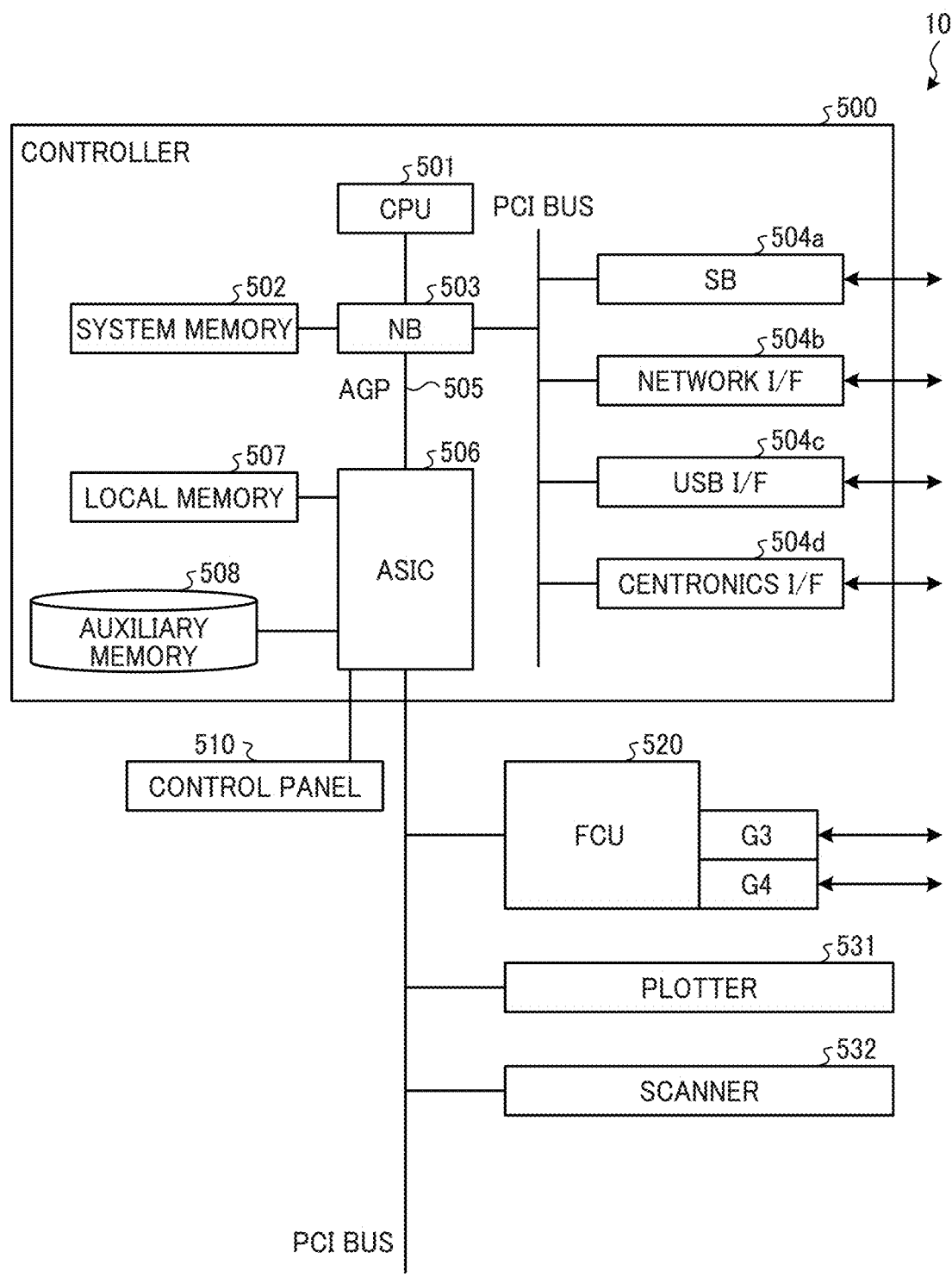
FIG. 2 is a block diagram illustrating an example of a hardware configuration of an image forming apparatus according to one embodiment of the present disclosure.

FIG. 2 is a block diagram illustrating an example of a hardware configuration of an image forming apparatus according to the present embodiment. A description is given of the hardware configuration of the image forming apparatus 10 according to the present embodiment with reference to FIG. 2.

As illustrated in FIG. 2, the image forming apparatus 10 according to the present embodiment includes a controller 500, a control panel 510, a facsimile control unit (FCU) 520, a plotter 531 (printing device), and a scanner 532, which are connected one another via a peripheral component interface (PCI) bus.

The controller 500 is a device that controls entire operation, drawing, and communication performed by the image forming apparatus 10 and controls input from the control panel 510.

The control panel 510 is, for example, a touch panel. The control panel 510 is a device that receives an input to the controller 500 (input function) and displays the status of the image forming apparatus 10 (display function). The control panel 510 is directly connected to an application-specific integrated circuit (ASIC) 506 to be described later.

The FCU 520 is a device that provides a facsimile communication function, and is connected to the ASIC 506 via, for example, the PCI bus.

The plotter 531 is a device that provides a printing function, and is connected to the ASIC 506 via, for example, the PCI bus. The scanner 532 is a device that provides a scanning function, and is connected to the ASIC 506 via, for example, the PCI bus.

The controller 500 includes a central processing unit (CPU) 501, a system memory 502, a north bridge (NB) 503, a south bridge (SB) 504a, a network interface (I/F) 504b, a universal serial bus (USB) I/F 504c, a Centronics I/F 504d, the ASIC 506, a local memory 507, and an auxiliary memory 508.

The CPU 501 controls entire operation of the image forming apparatus 10. The CPU 501 is connected to a chipset including the system memory 502, the NB 503, and the SB 504a, and is connected to other devices via the chipset.

The system memory 502 is a memory for storing programs and data, loading programs and data, and loading drawing data. The system memory 502 includes a read only memory (ROM) and a random access memory (RAM). The ROM is a read-only memory for storing programs and data. The RAM is a writable and readable memory for loading programs and data, and loading drawing data.

The NB 503 is a bridge for connecting the CPU 501 to the system memory 502, the SB 504a, and an accelerated graphics port (AGP) bus 505. The NB 503 includes a memory controller that controls reading from and writing to the system memory 502, a peripheral component interconnect (PCI) master, and an AGP target.

The SB 504a connects the NB 503 with PCI devices and peripheral devices. The SB 504a is connected to the NB 503 via the PCI bus, and the network I/F 504b, the USB I/F 504c, and the Centronics I/F 504d are connected to the PCI bus.

The network I/F 504b is an interface for communicating data with an external apparatus such as the information processing apparatus 20 using the network N. The network I/F 504b is, for example, an interface compliant with ETHERNET and can establish communications in compliance with transmission control protocol (TCP)/internet protocol (IP).

The USB I/F 504c is an interface that can communicate with devices compliant with a USB standard.

The Centronics I/F 504d is an interface having a specification of a parallel port that can transmit a plurality of bits.

The AGP bus 505 is a bus interface for a graphics accelerator card, which has been proposed to accelerate graphics processing. Through directly accessing the system memory 502 by high-throughput, speed of the graphics accelerator card is improved.

The ASIC 506 is an integrated circuit (IC) for image processing applications including hardware elements for image processing and has a role of a bridge connecting the AGP bus 505, the PCI bus, the auxiliary memory 508, and the local memory 507 one another. The ASIC 506 includes a PCI target, an AGP master, an arbiter (ARB) as a central processing unit of the ASIC 506, a memory controller for controlling the local memory 507, a plurality of direct memory access controllers (DMACs) capable of rotating image data with a hardware logic, and a PCI unit that transfers data between the plotter 531 and the scanner 532 via the PCI bus. For example, the FCU 520, the plotter 531, and the scanner 532 are connected to the ASIC 506 via the PCI bus. The ASIC 506 is also connected to a host PC and a network.

The local memory 507 is a memory used as a copy image buffer and a code buffer.

The auxiliary memory 508 is a storage area such as a hard disk drive (HDD), a solid state drive (SSD), a secure digital (SD) card, or a flash memory, and stores image data, programs, font data, and forms.

The program designed for the image forming apparatus 10 may be recorded on a computer-readable recording medium, such as the auxiliary memory 508, for distribution in an installable or an executable file format.

The hardware configuration of the image forming apparatus 10 illustrated in FIG. 2 is an example. The image forming apparatus 10 does not necessarily include all the components illustrated in FIG. 2, or may include some other components.

Hardware Configuration of Information Processing Apparatus

Figure 3:
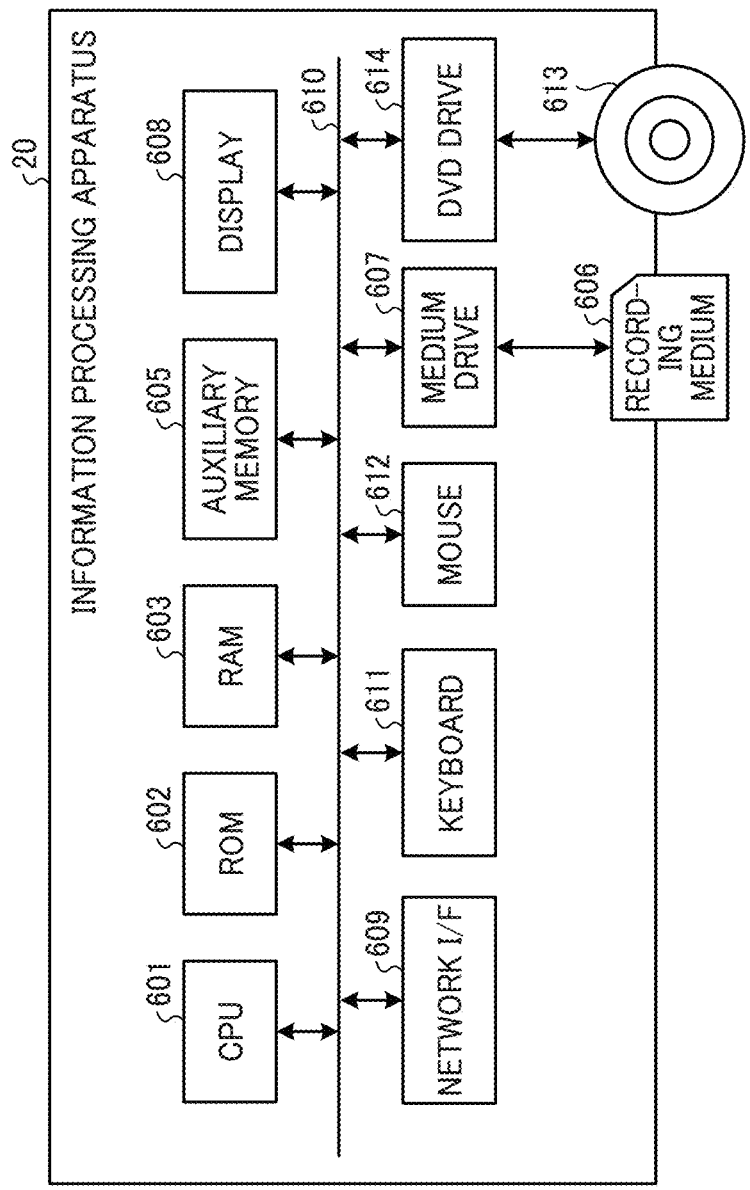
FIG. 3 is a block diagram illustrating an example of a hardware configuration of an information processing apparatus according to one embodiment of the present disclosure.

FIG. 3 is a block diagram illustrating an example of a hardware configuration of an information processing apparatus according to the present embodiment. A description is given of the hardware configuration of the information processing apparatus 20 according to the present embodiment with reference to FIG. 3.

As illustrated in FIG. 3, the information processing apparatus 20 includes a CPU 601, a ROM 602, a RAM 603, an auxiliary memory 605, a medium drive 607, a display 608, a network I/F 609, a keyboard 611, a mouse 612, and a digital versatile disc (DVD) drive 614.

The CPU 601 is a processor that controls entire operation of the information processing apparatus 20. The ROM 602 is a nonvolatile storage device that stores programs for the information processing apparatus 20. The RAM 603 is a volatile storage device used as a work area for the CPU 601.

The auxiliary memory 605 is a storage device such as an HDD or an SSD that stores various data and programs. The medium drive 607 is a device that controls reading and writing of data to and from a recording medium 606 such as a flash memory under control of the CPU 601.

The display 608 is a display device including a liquid crystal or an organic electro-luminescence (EL), which displays various information such as a cursor, a menu, a window, characters, or an image.

The network I/F 609 is an interface for communicating data with an external apparatus such as the image forming apparatus 10 and the image reading device 30 using the network N. The network I/F 609 is, for example, a network interface card (NIC) compliant with ETHERNET and can establish communications in compliance with TCP/IP.

The keyboard 611 is an input device for selecting characters, numbers, or various instructions, and for moving a cursor, for example. The mouse 612 is an input device for selecting and executing various instructions, selecting a processing object, and moving a cursor, for example.

The DVD drive 614 is a device that controls reading and writing of various data from and to a DVD 613 that is an example of a removable storage medium such as a digital versatile disc read only memory (DVD-ROM) or a digital versatile disc recordable (DVD-R).

The CPU 601, the ROM 602, the RAM 603, the auxiliary memory 605, the medium drive 607, the display 608, the network I/F 609, the keyboard 611, the mouse 612, and the DVD drive 614 are communicably connected to one another via a bus line 610 such as an address bus or a data bus.

Note that the configuration of the information processing apparatus 20 illustrated in FIG. 3 is an example. The information processing apparatus 20 does not necessarily include all the components illustrated in FIG. 3, or may include some other components.

Functional Configuration and Operation of Image Forming System

Figure 4:
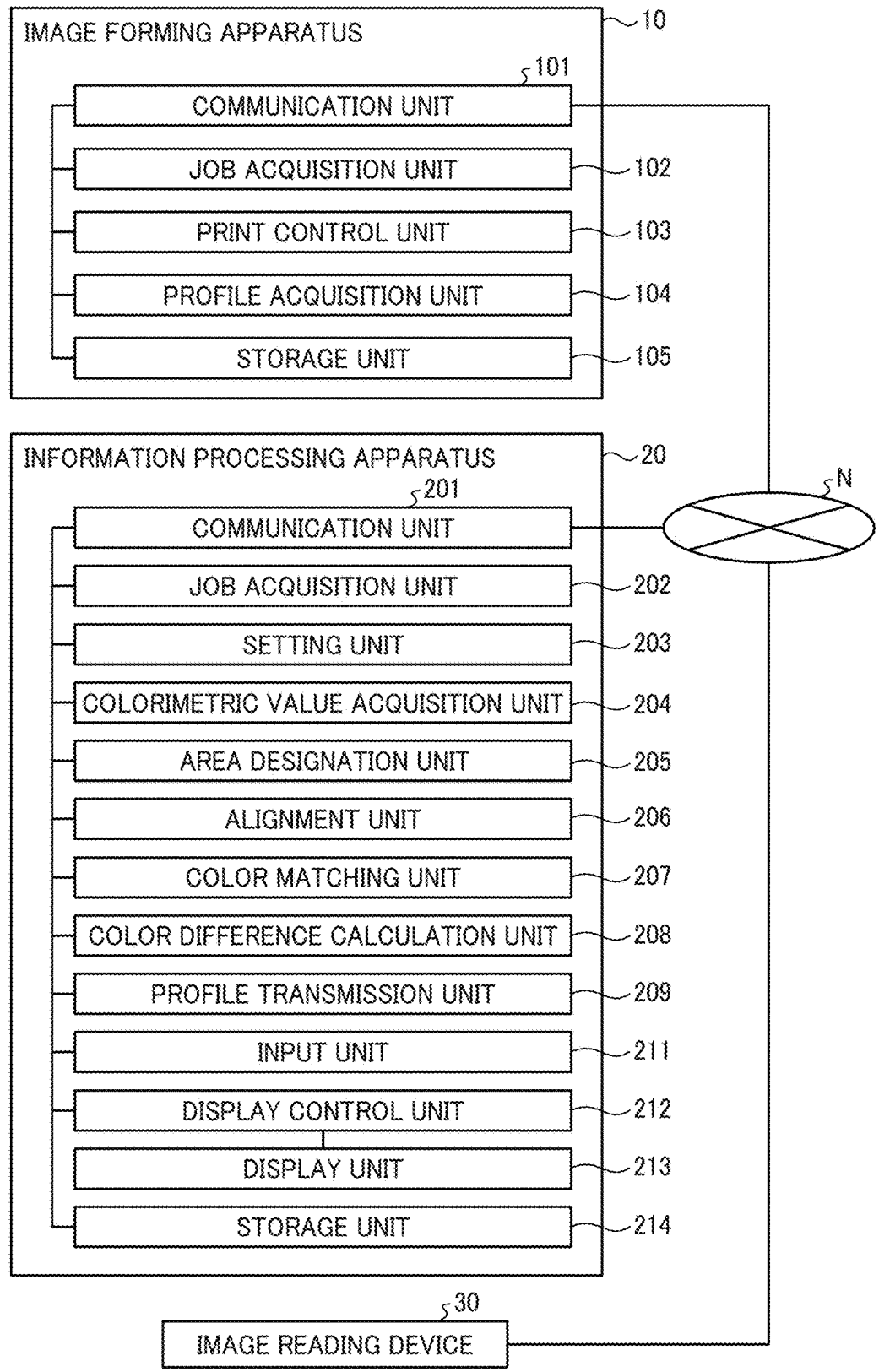
FIG. 4 is a block diagram illustrating an example of a functional configuration of the image forming system according to one embodiment of the present disclosure.

FIG. 4 is a block diagram illustrating an example of a functional configuration of the image forming system according to the present embodiment. A description is given of the functional configuration and operation of the image forming system 1 according to the present embodiment with reference to FIG. 4.

As illustrated in FIG. 4, the image forming apparatus 10 includes a communication unit 101, a job acquisition unit 102, a print control unit 103, a profile acquisition unit 104, and a storage unit 105.

The communication unit 101 is a functional unit that performs data communication with the information processing apparatus 20 via the network N. The communication unit 101 is implemented by the network I/F 504b and the CPU 501 illustrated in FIG. 2 executing a program.

The job acquisition unit 102 is a functional unit that acquires a print job of the document data from the information processing apparatus 20. In addition, the job acquisition unit 102 acquires normal print jobs from external devices via the network N. The job acquisition unit 102 is implemented by, for example, the CPU 501 illustrated in FIG. 2 executing a program.

The print control unit 103 is a functional unit that causes the plotter 531 to perform print output of a reproduced image printed matter based on the print job of the document data acquired by the job acquisition unit 102 by applying a profile selected in advance. The print control unit 103 is implemented by, for example, the CPU 501 illustrated in FIG. 2 executing a program.

The profile acquisition unit 104 is a functional unit that acquires, via the communication unit 101, a profile generated by the information processing apparatus 20 executing the color matching. The profile acquisition unit 104 stores (registers) the acquired profile in the storage unit 105. The profile stored in the storage unit 105 is applied to the control of the print output to a sheet performed by the print control unit 103. The profile acquisition unit 104 is implemented by, for example, the CPU 501 illustrated in FIG. 2 executing a program.

The storage unit 105 is a functional unit that stores the profile acquired by the profile acquisition unit 104, various data, programs, and the like. The storage unit 105 is implemented by the auxiliary memory 508 illustrated in FIG. 2.

Of the functional units of the image forming apparatus 10 illustrated in FIG. 4, at least a part of the functional units implemented by software (program) may be implemented by a hardware circuit such as a field-programmable gate array (FPGA) or an ASIC.

Further, each functional unit of the image forming apparatus 10 illustrated in FIG. 4 is a conceptual representation of a function, and the functional configuration of the image forming apparatus 10 is not limited thereto. For example, two or more of the functional units of the image forming apparatus 10 illustrated as independent units in FIG. 4 may be integrated into a single functional unit. By contrast, a plurality of functions provided by one functional unit of the image forming apparatus 10 illustrated in FIG. 4 may be divided and allocated to a plurality of functional units.

As illustrated in FIG. 4, the information processing apparatus 20 includes a communication unit 201 (read instruction unit), a job acquisition unit 202, a setting unit 203, a colorimetric value acquisition unit 204, an area designation unit 205, an alignment unit 206, a color matching unit 207, a color difference calculation unit 208, a profile transmission unit 209, an input unit 211, a display control unit 212, a display unit 213, and a storage unit 214.

The communication unit 201 is a functional unit that performs data communication with the image forming apparatus 10 and the image reading device 30 via the network N. The communication unit 201 is implemented by the network I/F 609 and the CPU 601 illustrated in FIG. 3 executing a program.

The job acquisition unit 202 is a functional unit that transmits, to the image forming apparatus 10 via the communication unit 201, the print job of the document data to be printed out by the image forming apparatus 10 as the reproduced image printed matter. The job acquisition unit 202 is implemented by, for example, the CPU 601 illustrated in FIG. 3 executing a program.

The setting unit 203 is a functional unit that performs, in accordance with an input to the input unit 211 operated by a user, setting a size of a document, selecting a profile, selecting an intent, and the like on a color sample matching screen 1000 to be described later. The setting unit 203 is implemented by, for example, the CPU 601 illustrated in FIG. 3 executing a program.

The colorimetric value acquisition unit 204 is a functional unit that acquires, from the image reading device 30 via the communication unit 201, the read data including the colorimetric values obtained by the image reading device 30 executing the reading processing on the reproduced image printed matter printed out by the image forming apparatus 10, a printed matter printed by a particular printer (the image forming apparatus 10 in a past state or an ideal printer), or a print sample such as a book already existing as a printed matter. The colorimetric value acquisition unit 204 is implemented by, for example, the CPU 601 illustrated in FIG. 3 executing a program.

The area designation unit 205 is a functional unit that designates, in accordance with an input to the input unit 211 operated by the user, an area in each image of the print sample and the reproduced image printed matter to align both the images. The image of the print sample (hereinafter also referred to as a "sample image") is an image displayed based on the read data of the print sample (first read data), and the image of the reproduced image printed matter (hereinafter also referred to as a "reproduced image") is an image displayed based on the read data of the reproduced image printed matter (second read data). The area designation unit 205 is implemented by, for example, the CPU 601 illustrated in FIG. 3 executing a program.

The alignment unit 206 is a functional unit that aligns the sample image and the reproduced image so that the color matching can be executed for the color of the reproduced image to be matched with the color of the sample image. The alignment unit 206 is implemented by, for example, the CPU 601 illustrated in FIG. 3 executing a program.

The color matching unit 207 is a functional unit that executes the color matching for the color of the reproduced image to be matched with the color of the sample image based on the document data. Specifically, the color matching unit 207 generates a profile to be applied to the control of the print output of the document data by adjusting the color of the reproduced image to be matched with the color of the sample image. The color matching unit 207 is implemented by, for example, the CPU 601 illustrated in FIG. 3 executing a program.

The color difference calculation unit 208 is a functional unit that calculates a color difference between the sample image and the reproduced image after color matching to generate a color difference map (second color difference image). For example, the color difference calculation unit 208 calculates, for each pixel of the sample image, a color difference (difference in pixel value) from a corresponding pixel of the reproduced image. In addition, the color difference calculation unit 208 calculates a color difference between the sample image and the reproduced image (that is, the reproduced image before color matching) to generate a color difference map (first color difference image). The color difference map is, for example, a map representing the color difference in each pixel in monochrome gradation. Further, the color difference calculation unit 208 calculates an average color difference that is an average value of the color difference. The color difference calculation unit 208 is implemented by, for example, the CPU 601 illustrated in FIG. 3 executing a program.

The profile transmission unit 209 is a functional unit that transmits the profile generated by the color matching unit 207 to the image forming apparatus 10 via the communication unit 201. Then, the profile transmission unit 209 receives a notification indicating registration of the profile from the image forming apparatus 10 via the communication unit 201. The profile transmission unit 209 is implemented by, for example, the CPU 601 illustrated in FIG. 3 executing a program.

The input unit 211 is a functional unit that receives an input operated by the user. The input unit 211 is implemented by the keyboard 611 and the mouse 612 illustrated in FIG. 3.

The display control unit 212 is a functional unit that controls the display unit 213 (the display 608) to display various screens (such as the color sample matching screen 1000 to be described later) and information. The display control unit 212 is implemented by, for example, the CPU 601 illustrated in FIG. 3 executing a program.

The display unit 213 is a functional unit that displays the various screens and the information under the control of the display control unit 212. The display unit 213 is implemented by the display 608 illustrated in FIG. 3.

The storage unit 214 is a functional unit that stores the document data, the profile generated by the color matching unit 207, and the like. The storage unit 214 is implemented by the auxiliary memory 605 illustrated in FIG. 3.

Of the functional units of the information processing apparatus 20 illustrated in FIG. 4, at least a part of the functional units implemented by software (program) may be implemented by a hardware circuit such as an FPGA or an ASIC.

Further, each functional unit of the information processing apparatus 20 illustrated in FIG. 4 is a conceptual representation of a function, and the functional configuration of the information processing apparatus 20 is not limited thereto. For example, two or more of the functional units of the information processing apparatus 20 illustrated as independent units in FIG. 4 may be integrated into a single functional unit. By contrast, a plurality of functions provided by one functional unit of the information processing apparatus 20 illustrated in FIG. 4 may be divided and allocated to a plurality of functional units.

Color Sample Matching Screen of Information Processing Apparatus

Figure 5:
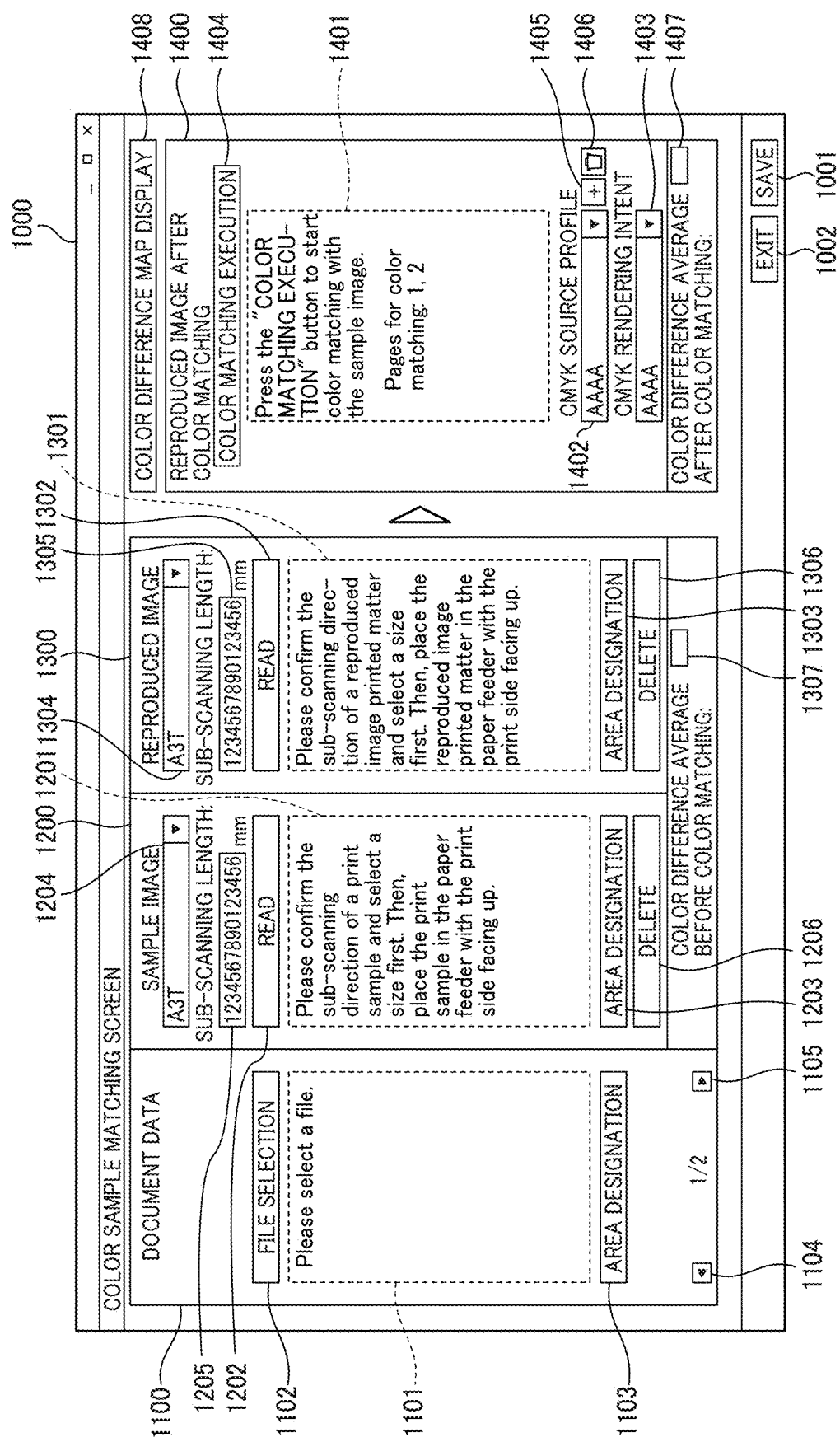
FIG. 5 is a diagram illustrating an example of a color sample matching screen in an initial state according to one embodiment of the present disclosure.
Figure 6:
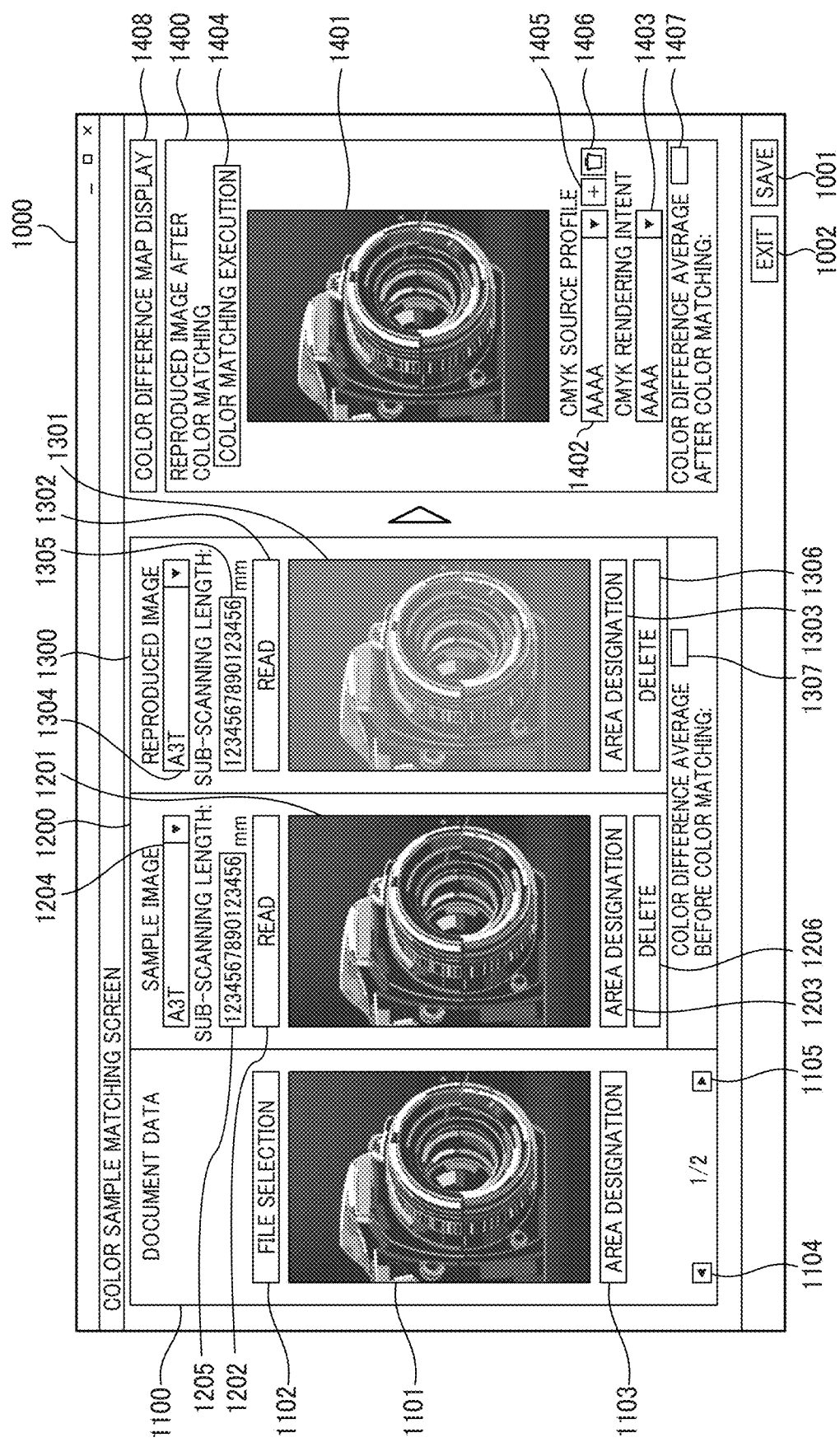
FIG. 6 is a diagram illustrating an example of the color sample matching screen in a state when color matching is executed according to one embodiment of the present disclosure.
Figure 7:
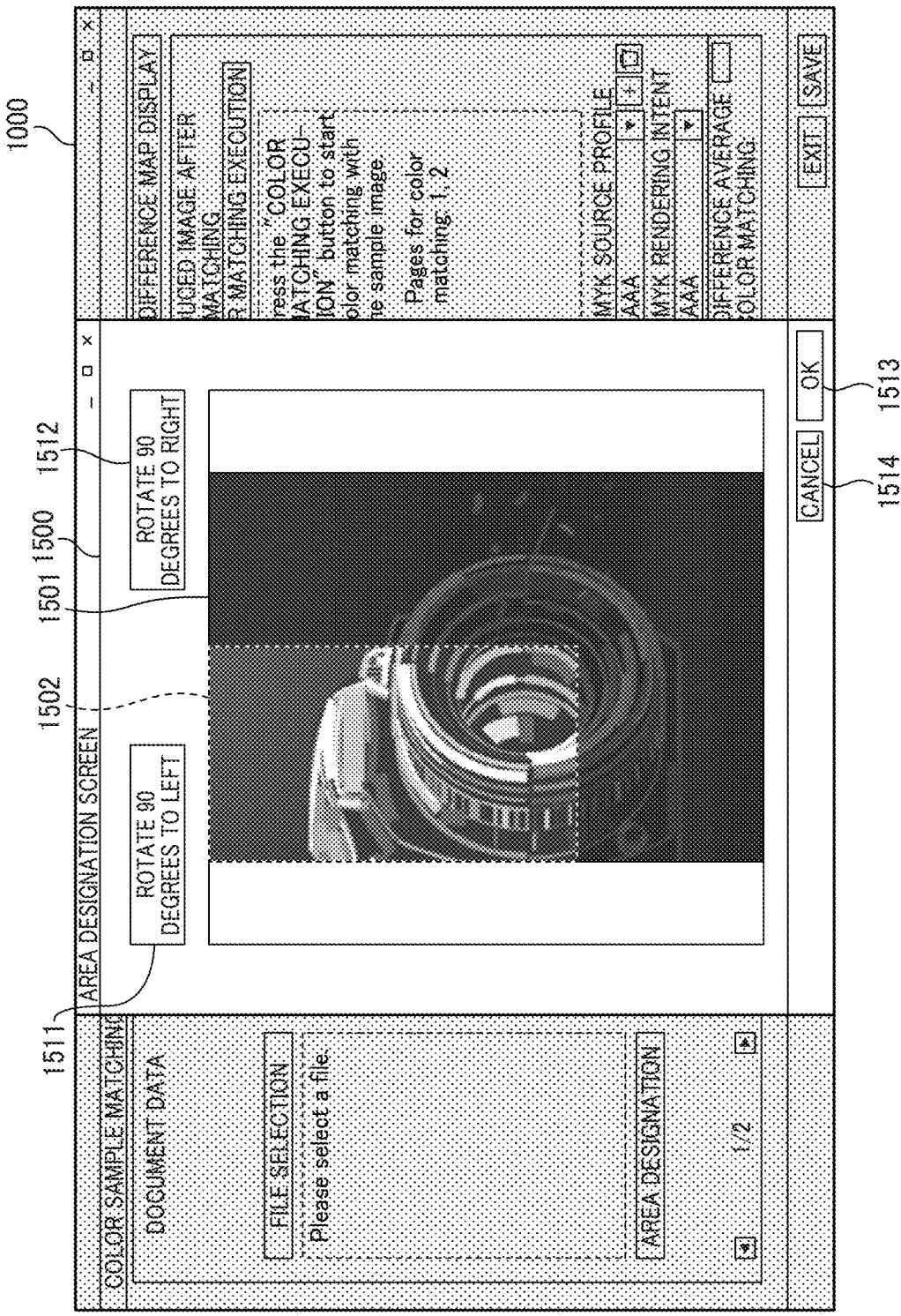
FIG. 7 is a diagram illustrating an example of an area designation screen for designating an area according to one embodiment of the present disclosure.
Figure 8:
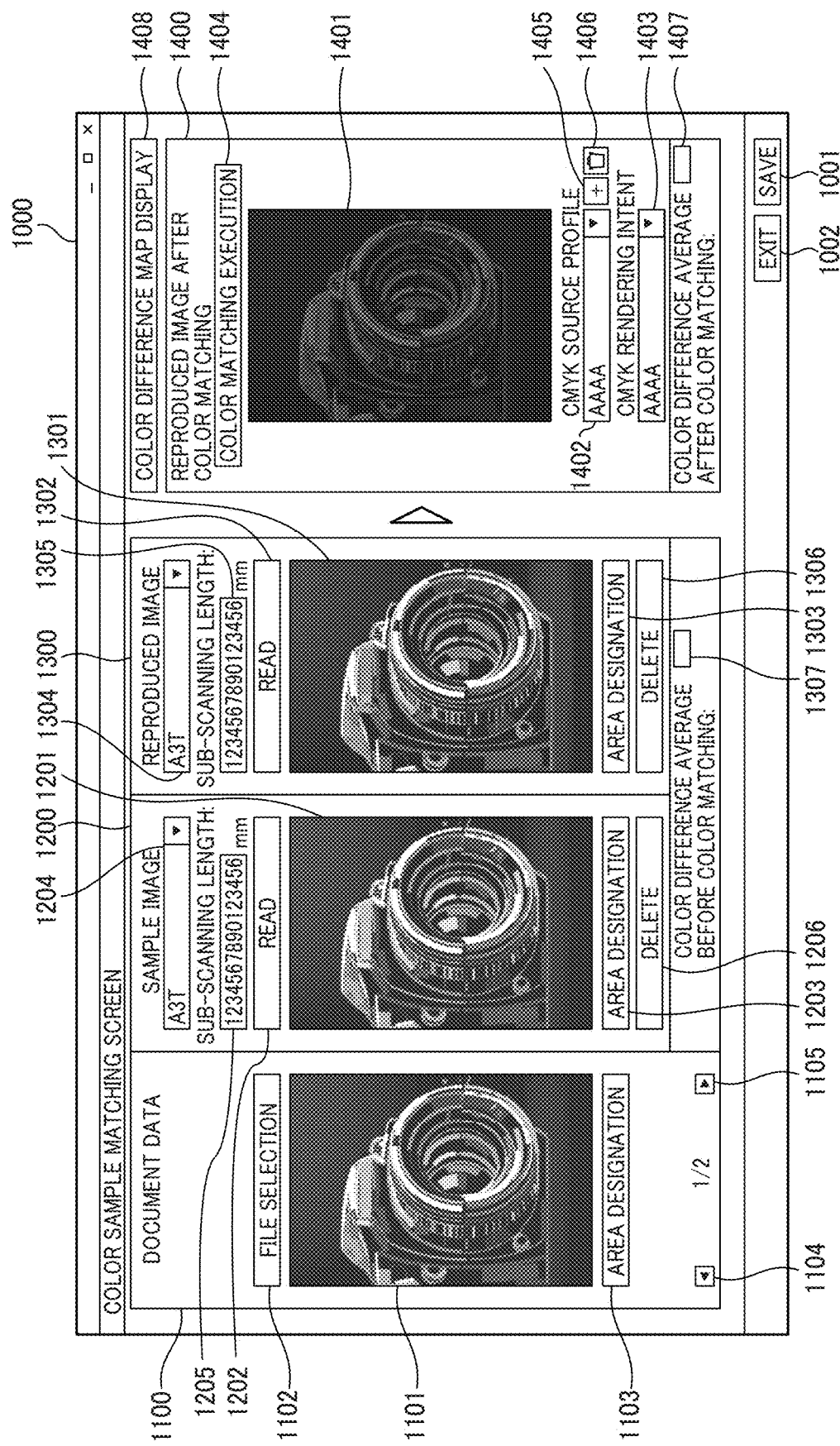
FIG. 8 is a diagram illustrating an example of the color sample matching screen that presents a color difference map according to one embodiment of the present disclosure.

FIG. 5 is a diagram illustrating an example of a color sample matching screen in an initial state according to the present embodiment. FIG. 6 is a diagram illustrating an example of the color sample matching screen in a state when color matching is executed according to the present embodiment. FIG. 7 is a diagram illustrating an example of an area designation screen for designating an area according to the present embodiment. FIG. 8 is a diagram illustrating an example of the color sample matching screen that presents a color difference map according to the present embodiment. A description is given of the color sample matching screen 1000 displayed in the information processing apparatus 20 according to the present embodiment with reference to FIGS. 5 to 8.

The color sample matching screen 1000 illustrated in FIG. 5 is a screen displayed on the display unit 213 (i.e., the display 608) under the control of the display control unit 212 in accordance with an input to the input unit 211 operated by the user. The color sample matching screen 1000 is a screen for executing color matching processing in the image forming system 1.

As illustrated in FIG. 5, the color sample matching screen 1000 includes a save button 1001, an exit button 1002, a document data operation field 1100, a sample image operation field 1200, a reproduced image operation field 1300, a color matching operation field 1400, and a color difference map display button 1408 (an example of a third operation element).

The save button 1001 is a button for saving the profile generated by the color matching unit 207 executing the color matching. The exit button 1002 is a button for ending the operation of the color matching on the color sample matching screen 1000 to transition to a top screen 2000 to be described later.

The document data operation field 1100 is a field for selecting the document data subjected to color matching to display an image of the document data (a first image). As illustrated in FIG. 5, the document data operation field 1100 includes a document data display field 1101 (a first display field), a file selection button 1102, an area designation button 1103, a page back button 1104, and a page forward button 1105.

The document data display field 1101 is a field for displaying an image of document data selected according to an operation of the file selection button 1102.

The file selection button 1102 is a button for selecting document data to be displayed as an image in the document data display field 1101. As illustrated in FIG. 6, the display control unit 212 displays, on the display 608, the image of the document data selected according to the operation of the file selection button 1102 in the document data display field 1101.

The area designation button 1103 is a button for designating an area in the image of the document data displayed in the document data display field 1101. When the area designation button 1103 is pressed, the display control unit 212 displays an area designation screen 1500 illustrated in FIG. 7.

The page back button 1104 is a button for switching an image displayed in the document data display field 1101 to a previous image in a case where the document data includes a plurality of images. The page forward button 1105 is a button for switching the image displayed in the document data display field 1101 to the next image in the case where the document data includes the plurality of images.

The sample image operation field 1200 is a field for displaying the sample image (a second image) based on the read data of the print sample read by the image reading device 30. As illustrated in FIG. 5, the sample image operation field 1200 includes a print sample display field 1201 (a second display field), a read button 1202 (an example of a first operation element), an area designation button 1203, a size selection field 1204, a sub-scanning length input field 1205, and a delete button 1206.

The print sample display field 1201 is a field for displaying the sample image based on the read data of the print sample.

The read button 1202 is a button for causing the image reading device 30 to execute reading processing on the print sample. As illustrated in FIG. 6, the display control unit 212 displays the sample image in the print sample display field 1201 based on the read data of the print sample read by the image reading device 30 in response to the operation of the read button 1202.

The area designation button 1203 is a button for designating an area in the sample image displayed in the print sample display field 1201. When the area designation button 1203 is pressed, the display control unit 212 displays the area designation screen 1500 illustrated in FIG. 7.

A description is now given of the area designation screen 1500 illustrated in FIG. 7. The area designation screen 1500 is a screen for designating an area in each of the sample image and the reproduced image to align both the images. When the area designation screen 1500 is displayed in response to an operation of the area designation button 1203, area designation in the sample image can be performed. As illustrated in FIG. 7, the area designation screen 1500 includes an image display field 1501, a left rotation button 1511, a right rotation button 1512, an "OK" button 1513, and a cancel button 1514.

The image display field 1501 is a field for displaying an image (in this example, the sample image). The area designation unit 205 designates an area (a designated area 1502) in the sample image according to a drag operation or the like performed by the user using the input unit 211.

The left rotation button 1511 is a button for rotating the image displayed in the image display field 1501 to the left. The right rotation button 1512 is a button for rotating the image displayed in the image display field 1501 to the right.

The "OK" button 1513 is a button for confirming the area designated by the area designation unit 205. The cancel button 1514 is a button for canceling the area designation by the area designation unit 205. When the "OK" button 1513 or the cancel button 1514 is pressed, the display control unit 212 hides the area designation screen 1500 and displays the color sample matching screen 1000.

The size selection field 1204 is a field for selecting a size of the print sample when the image reading device 30 executes reading processing on the print sample. The sub-scanning length input field 1205 is a field for inputting the length of the print sample in the sub-scanning direction when the size of the print sample selected in the size selection field 1204 is not a standard size.

The delete button 1206 is a button for deleting (hiding) the sample image displayed in the print sample display field 1201.

The reproduced image operation field 1300 is a field for displaying the reproduced image (a third image) based on the read data of the reproduced image printed matter read by the image reading device 30. As illustrated in FIG. 5, the reproduced image operation field 1300 includes a reproduced image display field 1301 (a third display field), a read button 1302 (an example of a second operation element), an area designation button 1303, a size selection field 1304, a sub-scanning length input field 1305, a delete button 1306, and a color difference before color matching display field 1307.

The reproduced image display field 1301 is a field for displaying the reproduced image based on the read data of the reproduced image printed matter.

The read button 1302 is a button for causing the image reading device 30 to execute reading processing on the reproduced image printed matter. As illustrated in FIG. 6, the display control unit 212 displays the reproduced image in the reproduced image display field 1301 based on the read data of the reproduced image printed matter read by the image reading device 30 in response to the operation of the read button 1202.

The area designation button 1303 is a button for designating an area in the reproduced image displayed in the reproduced image display field 1301. When the area designation button 1303 is pressed, the display control unit 212 displays the area designation screen 1500 illustrated in FIG. 7. The operation of designating the area in the reproduced image on the area designation screen 1500 is the same as the operation of designating the area in the sample image described above.

The size selection field 1304 is a field for selecting a size of the reproduced image printed matter when the image reading device 30 executes reading processing on the reproduced image printed matter. The sub-scanning length input field 1305 is a field for inputting the length of the reproduced image printed matter in the sub-scanning direction when the size of the reproduced image printed matter selected in the size selection field 1304 is not a standard size.

The delete button 1306 is a button for deleting (hiding) the reproduced image displayed in the reproduced image display field 1301.

The color difference before color matching display field 1307 is a field for displaying an average color difference between the sample image and the reproduced image before color matching calculated by the color difference calculation unit 208 when color matching is executed by the color matching unit 207 in response to pressing of a color matching execution button 1404 to be described later.

The color matching operation field 1400 is a field for displaying an image after execution of color matching for the color of the reproduced image (a reproduced image after color matching) (a fourth image) displayed in the reproduced image display field 1301 to be matched with the color of the sample image displayed in the print sample display field 1201. As illustrated in FIG. 5, the color matching operation field 1400 includes a reproduced image after color matching display field 1401 (a fourth display field), a profile selection field 1402, a rendering intent selection field 1403, the color matching execution button 1404, a profile addition button 1405, a profile deletion button 1406, and a color difference after color matching display field 1407.

The reproduced image after color matching display field 1401 is a field for displaying an image after the color matching is executed by the color matching unit 207 for the color of the reproduced image displayed in the reproduced image display field 1301 (the reproduced image after color matching) to be matched with the color of the sample image displayed in the print sample display field 1201.

The profile selection field 1402 is a field for selecting a profile to be applied to the control of the print output of the reproduced image printed matter, which the print control unit 103 causes the plotter 531 to perform based on the print job of the document data. In addition, for example, when the color matching is executed by the color matching unit 207 in response to pressing of the color matching execution button 1404, the profile selected in the profile selection field 1402 is updated to the profile lastly generated by the color matching unit 207.

The rendering intent selection field 1403 is a field for selecting a rendering intent to be applied to the control of the print output of the reproduced image printed matter based on the print job of the document data, which the print control unit 103 causes the plotter 531 to perform.

The color matching execution button 1404 is a button for causing the color matching unit 207 to execute color matching for the color of the reproduced image displayed in the reproduced image display field 1301 to be matched with the color of the sample image displayed in the print sample display field 1201. The operation of the color matching execution button 1404 is enabled when the image of the document data is displayed in the document data display field 1101 (i.e., selection of the document data), the sample image is displayed in the print sample display field 1201 (i.e., acquisition of the read data of the print sample), and the reproduced image is displayed in the reproduced image display field 1301 (i.e., acquisition of the read data of the reproduced image printed matter).

The profile addition button 1405 is a button for adding a profile to the selection in the profile selection field 1402. The profile delete button 1406 is a button for deleting a profile included in the selection of the profile selection field 1402.

The color difference after color matching display field 1407 is a field for displaying an average color difference between the sample image and the reproduced image after color matching calculated by the color difference calculation unit 208 when color matching is executed by the color matching unit 207 in response to pressing of the color matching execution button 1404 to be described later.

The color difference map display button 1408 is a button for switching display of the reproduced image (before color matching) in the reproduced image display field 1301 and display of the reproduced image (after color matching) in the reproduced image after color matching display field 1401 to displays of the respective color difference maps generated by the color difference calculation unit 208 as illustrated in FIG. 8 after the color matching is executed in response to the operation of the color matching execution button 1404. In other words, when the color difference map display button 1408 is pressed, the display control unit 212 switches the display of the reproduced image (before color matching) in the reproduced image display field 1301 to the display of the color difference map between the sample image and the reproduced image (before color matching), and switches the display of the reproduce image after color matching in the reproduced image after color matching display field 1401 to the display of the color difference map between the sample image and the reproduced image after color matching. In addition, when the color difference map display button 1408 is pressed again, the display control unit 212 returns the display of the reproduced image display field 1301 and the reproduced image after color matching display field 1401 to the displays of the reproduced image and the reproduced image after color matching, respectively.

As described above, since the reproduced image display field 1301 and the reproduced image after color matching display field 1401 are arranged adjacent to each other on the color sample matching screen 1000, the reproduce images before and after color matching can be easily compared.

Overall Processing to be Executed by Image Forming System

Figure 9:
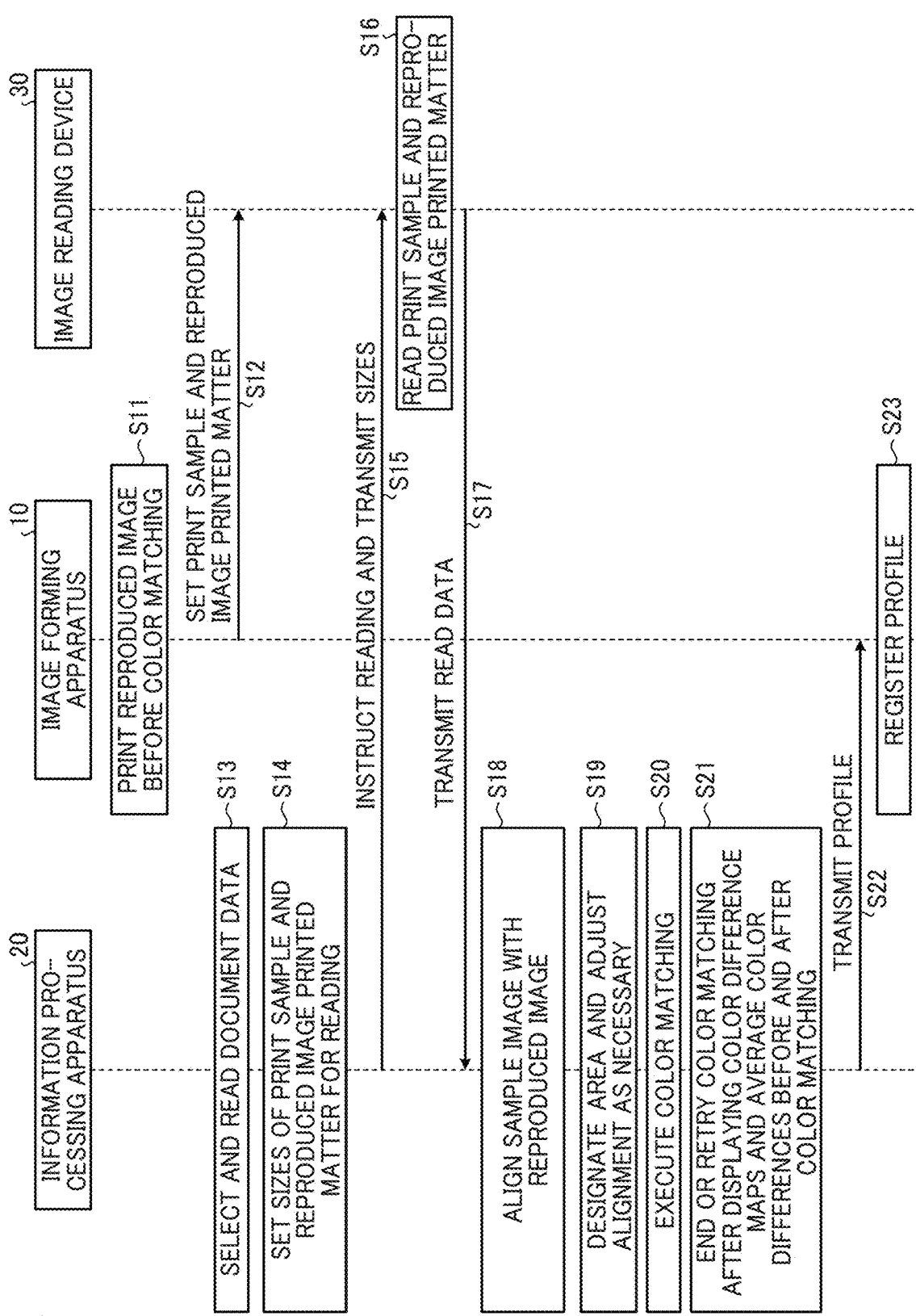
FIG. 9 is a sequence chart illustrating an example of overall processing to be executed by the image forming system according to one embodiment of the present disclosure.

FIG. 9 is a sequence chart illustrating an example of overall processing to be executed by the image forming system according to the present embodiment. A description is given of the overall processing to be executed by the image forming system 1 according to the present embodiment with reference to FIG. 9.

Step S11

The user performs, via the control panel 510 of the image forming apparatus 10, an operation for printing out the document data subjected to color matching. Accordingly, the job acquisition unit 102 acquires a print job of the document data from the information processing apparatus 20. Alternatively, the job acquisition unit 102 may generate the print job by acquiring the document data stored in the image forming apparatus 10. Then, the print control unit 103 causes the plotter 531 to perform print output of a reproduced image printed matter based on the print job of the document data acquired by the job acquisition unit 102 by applying a profile selected in advance. The profile selected in advance is a profile selected in the profile selection field 1402 on the color sample matching screen 1000 displayed by the display control unit 212 of the information processing apparatus 20.

Step S12

The user sets the print sample and the reproduced image printed matter printed out by the image forming apparatus 10 on the image reading device 30. In this case, it is preferable that the reproduced image printed matter is set on the image reading device 30 after the print sample is read, or the operation is performed in the reverse order. Note that the print sample and the reproduced image printed matter can be set on the image reading device 30 at the same time in a case where it is possible to identify whether the print sample or the reproduced image printed matter by reading a code (e.g., a color code) or the like for identifying each of the print sample and the reproduced image printed matter printed on each of the print sample and the reproduced image printed matter.

Step S13

The user selects the document data subjected to color matching by operating the file selection button 1102 in the document data operation field 1100 on the color sample matching screen 1000. The display control unit 212 reads the document data selected in response to the operation of the file selection button 1102 from the storage unit 214 to display the image of the document data in the document data display field 1101.

Step S14

The user selects a size of the print sample in the size selection field 1204 of the sample image operation field 1200 on the color sample matching screen 1000 and presses the read button 1202. The setting unit 203 of the information processing apparatus 20 sets the size according to the user operation. Further, the user selects a size of the reproduced image printed matter in the size selection field 1304 of the reproduced image operation field 1300 on the color sample matching screen 1000 and presses the read button 1302. The setting unit 203 of the information processing apparatus 20 sets the size according to the user operation.

Step S15

When the user presses the read button 1202 in the sample image operation field 1200, the communication unit 201 of the information processing apparatus 20 transmits an instruction to read the print sample and the size of the print sample selected in the size selection field 1204 to the image reading device 30. Further, when the user presses the read button 1302 in the reproduced image operation field 1300, the communication unit 201 transmits an instruction to read the reproduced image printed matter and the size of the reproduced image printed matter selected in the size selection field 1304 to the image reading device 30.

Step S16

In response to receiving the instruction to read the print sample and the size of the print sample from the information processing apparatus 20, the image reading device 30 executes reading processing on the print sample set on the image reading device 30 according to the selected size of the print sample. Further, in response to receiving the instruction to read the reproduced image printed matter and the size of the reproduced image printed matter from the information processing apparatus 20, the image reading device 30 executes reading processing on the reproduced image printed matter set on the image reading device 30 according to the selected size of the reproduced image printed matter.

Step S17

The image reading device 30 transmits the read data of the print sample to the information processing apparatus 20. The communication unit 201 of the information processing apparatus 20 receives the read data of the print sample. Further, the image reading device 30 transmits the read data of the reproduced image printed matter to the information processing apparatus 20. The communication unit 201 of the information processing apparatus 20 receives the read data of the reproduced image printed matter.

Although the above processing S14 to S17 is collectively described for the print sample and the reproduced image printed matter, the above processing S14 to S17 is actually executed individually for the print sample and the reproduced image printed matter.

Step S18

The display control unit 212 displays the sample image in the print sample display field 1201 based on the read data of the print sample received by the communication unit 201. Further, the display control unit 212 displays the reproduced image in the reproduced image display field 1301 based on the read data of the reproduced image printed matter received by the communication unit 201. Then, the alignment unit 206 aligns both the sample image and the reproduced image so that color matching can be executed for the color of the reproduced image to be matched with the color of the sample image. The user confirms whether the sample image displayed in the print sample display field 1201 and the reproduced image displayed in the reproduced image display field 1301 are properly aligned with each other.

Step S19

The area designation unit 205 designates an area in each of the sample image and the reproduced image to align the sample image with the reproduced image in accordance with an input to the input unit 211 operated by the user as necessary. Then, the alignment unit 206 aligns the sample image with the reproduced image based on the area designated by the area designation unit 205 in each of the sample image and the reproduced image.

Step S20

The color matching unit 207 executes color matching for the color of the reproduced image to be matched with the color of the sample image based on the document data. Specifically, the color matching unit 207 generates a profile to be applied to the control of the print output of the document data by adjusting the color of the reproduced image to be matched with the color of the sample image.

Step S21

When the user presses the color difference map display button 1408, the color difference calculation unit 208 calculates the color difference between the sample image and the reproduced image after color matching to generate a color difference map. The display control unit 212 switches the display of the reproduced image after color matching in the reproduced image after color matching display field 1401 to the display of the color difference map between the sample image and the reproduced image after color matching. In addition, the color difference calculation unit 208 calculates the color difference between the sample image and the reproduced image (i.e., the reproduced image before color matching) to generate the color difference map. The display control unit 212 switches the display of the reproduced image in the reproduced image display field 1301 to the display of the color difference map between the sample image and the reproduced image before color matching.

Further, the color difference calculation unit 208 calculates an average color difference between the sample image and the reproduced image after color matching. The display control unit 212 displays the average color difference between the sample image and the reproduced image after color matching in the color difference after color matching display field 1407 of the color matching operation field 1400. Furthermore, the color difference calculation unit 208 calculates an average color difference between the sample image and the reproduced image before color matching. The display control unit 212 displays the average color difference between the sample image and the reproduced image before color matching in the color difference before color matching display field 1307 of the reproduced image operation field 1300.

The user checks the color difference maps displayed in the reproduced image display field 1301 and the reproduced image after color matching display field 1401, and the average color differences displayed in the color difference before color matching display field 1307 and the color difference after color matching display field 1407 to determine whether to end or retry the color matching. The information processing apparatus 20 ends or retries the color matching according to a user operation based on the determination.

Step S22

When the user determines to end the color matching (operation of the exit button 1002 is received), the profile transmission unit 209 transmits the profile generated by the color matching unit 207 to the image forming apparatus 10 via the communication unit 201 in accordance with a user operation. Then, the information processing apparatus 20 ends the color matching. The communication unit 101 of the image forming apparatus 10 receives the profile.

Step S23

The profile acquisition unit 104 of the image forming apparatus 10 acquires the profile received by the communication unit 101 from the information processing apparatus 20. The profile acquisition unit 104 stores (registers) the acquired profile in the storage unit 105. Then, the profile acquisition unit 104 transmits a notification indicating registration of the profile to the information processing apparatus 20 via the communication unit 101.

Normal Screen Transition Performed by Information Processing Apparatus

Figure 10:
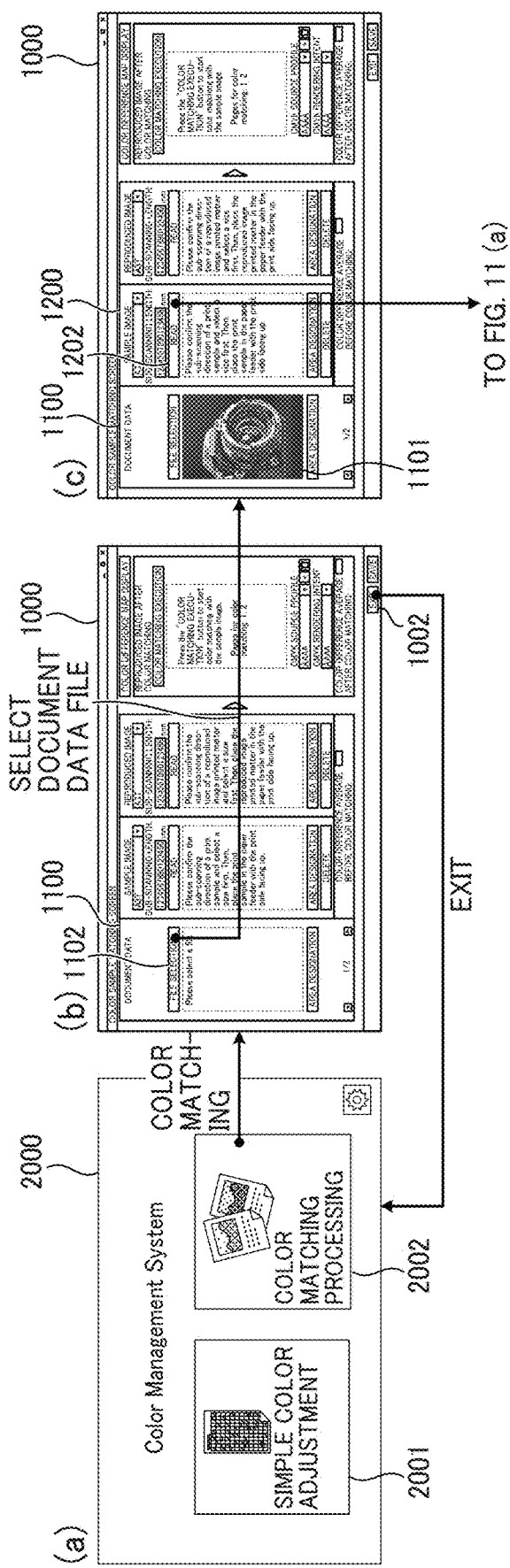
FIG. 10 is a diagram illustrating an example of a normal screen transition performed by the information processing apparatus according to one embodiment of the present disclosure.
Figure 11:
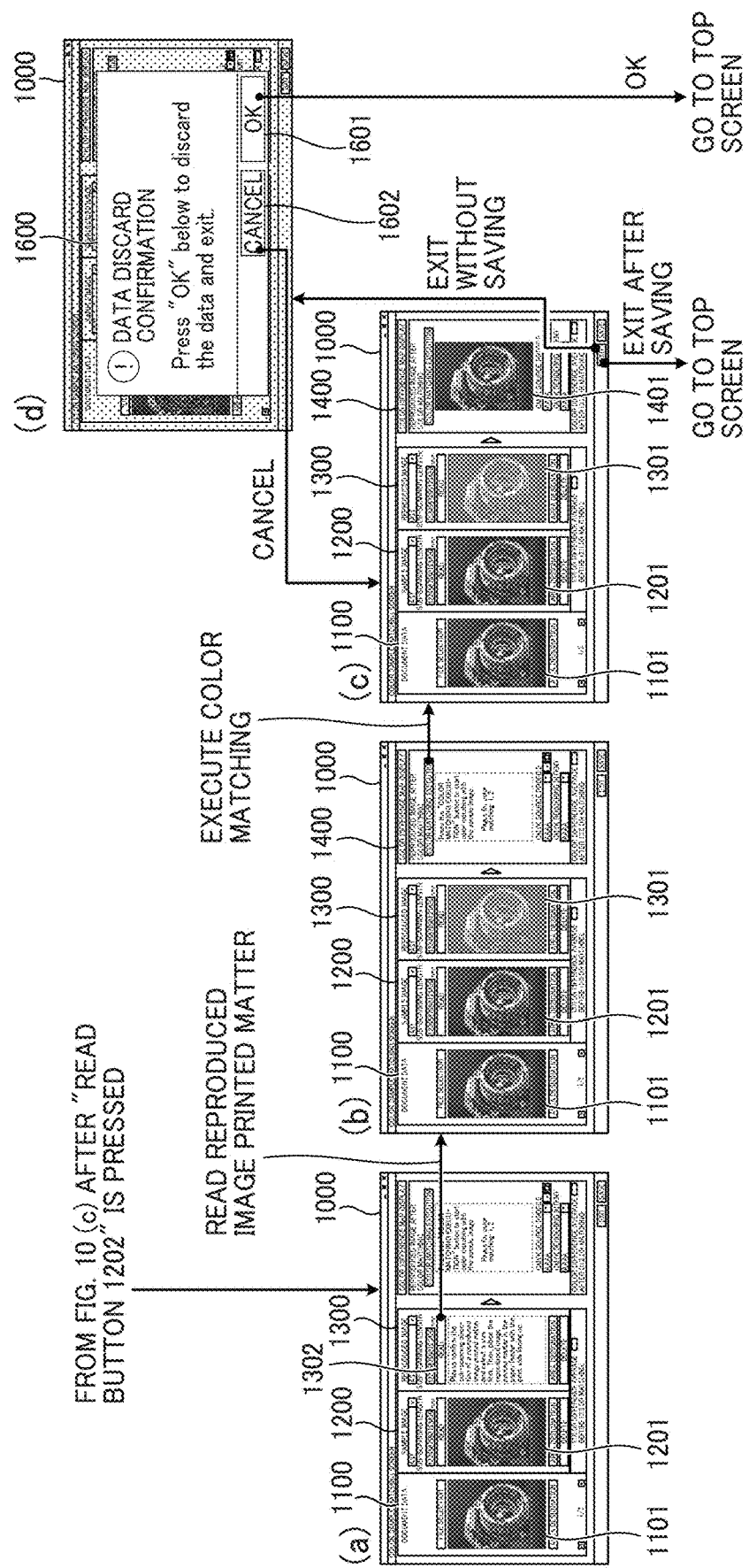
FIG. 11 is a diagram illustrating an example of a normal screen transition performed by the information processing apparatus according to one embodiment of the present disclosure.

FIGS. 10 and 11 are diagrams illustrating examples of a normal screen transition performed by the information processing apparatus according to the present embodiment. A description is given of the normal screen transition displayed on the display unit 213 of the information processing apparatus 20 according to the present embodiment with reference to FIGS. 10 and 11.

When a program is activated by the CPU 601 of the information processing apparatus 20, first, the display control unit 212 displays the top screen 2000 illustrated in part (a) of FIG. 10 on the display unit 213. The top screen 2000 is a screen for selecting to start either simple color adjustment processing or color matching processing with the color of the sample image (color matching processing). The top screen 2000 includes a simple color adjustment button 2001 and a color matching processing button 2002.

The simple color adjustment button 2001 is a button for executing the simple color adjustment processing. The color matching processing button 2002 is a button for executing the color matching processing.

When the user presses the color matching processing button 2002, the display control unit 212 displays the color sample matching screen 1000 in an initial state illustrated in part (b) of FIG. 10. Since the color sample matching screen 1000 illustrated in part (b) of FIG. 10 is a screen in the initial state before execution of the color matching processing, no image is displayed on the color sample matching screen 1000. When the user presses the exit button 1002 on the color sample matching screen 1000, the display control unit 212 displays the top screen 2000 illustrated in part (a) of FIG. 10.

When the document data is selected according to an operation of the file selection button 1102, the display control unit 212 displays the image of the selected document data in the document data display field 1101 as illustrated in part (c) of FIG. 10.

When the user presses the read button 1202, the image reading device 30 acquires read data of the print sample by executing reading processing on the print sample. The display control unit 212 displays the sample image in the print sample display field 1201 based on the read data of the print sample as illustrated in part (a) of FIG. 11.

When the user presses the read button 1302, the image reading device 30 acquires read data of the reproduced image printed matter by executing reading processing on the reproduced image printed matter. The display control unit 212 displays the reproduced image in the reproduced image display field 1301 based on the read data of the reproduced image printed matter as illustrated in part (b) of FIG. 11.

When the user presses the color matching execution button 1404, the color matching unit 207 executes color matching for the color of the reproduced image displayed in the reproduced image display field 1301 to be matched with the color of the sample image displayed in the print sample display field 1201. Then, as illustrated in part (c) of FIG. 11, the display control unit 212 displays an image after the color matching is executed by the color matching unit 207 (a reproduced image after color matching) in the reproduced image after color matching display field 1401.

In the state of the color sample matching screen 1000 illustrated in part (c) of FIG. 11, when the user presses the save button 1001, the profile generated by the color matching unit 207 executing the color matching is stored in the auxiliary memory 605. Alternatively, at the timing when the user presses the save button 1001, the profile transmission unit 209 may transmit the profile generated by the color matching unit 207 executing the color matching to the image forming apparatus 10 via the communication unit 201. When the user presses the exit button 1002 after the profile is stored, the display control unit 212 displays the top screen 2000 illustrated in part (a) of FIG. 10. On the other hand, when the user presses the exit button 1002 without the profile being stored, the display control unit 212 displays a data discard confirmation dialog box 1600 as illustrated in part (d) of FIG. 11.

The data discard confirmation dialog box 1600 illustrated in part (d) of FIG. 11 is a dialog box for confirming whether to discard the generated profile without being stored. The data discard confirmation dialog box 1600 includes an "OK" button 1601 and a cancel button 1602. The "OK" button 1601 is a button for transitioning to the top screen 2000 without the generated profile being stored. The cancel button 1602 is a button for canceling the transition to the top screen 2000 to return to the color sample matching screen 1000 illustrated in part (c) of FIG. 11.

Display Operation of Screen for Deleting Sample Image or Reproduced Image

Figure 12:
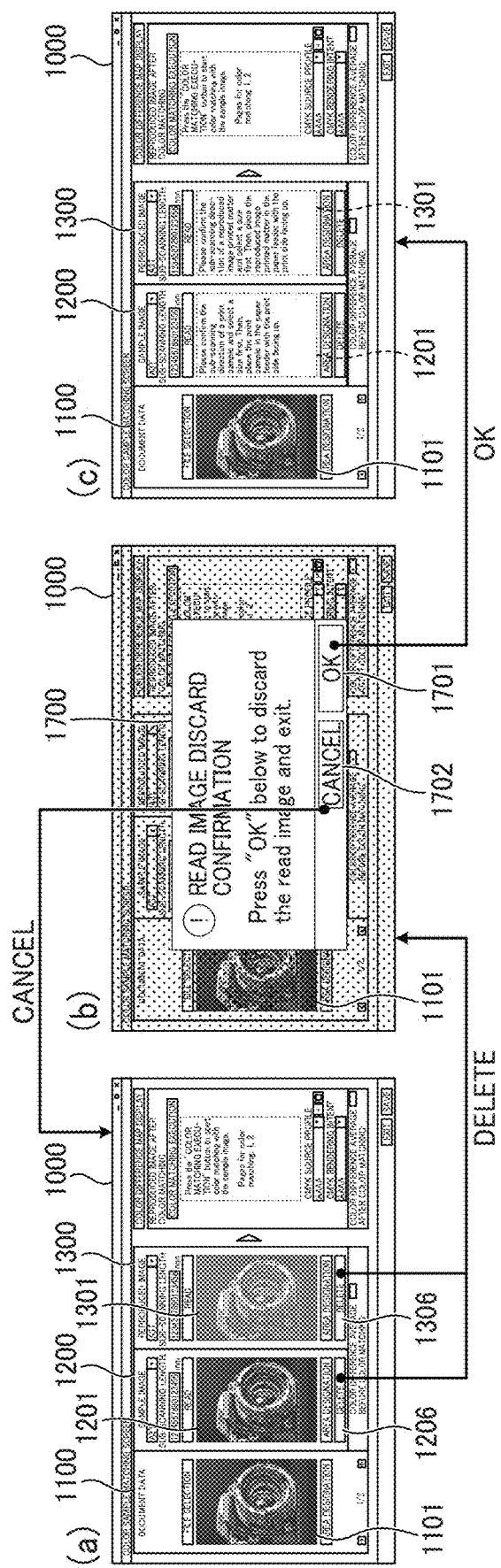
FIG. 12 is a diagram illustrating an example of display operation of a screen for deleting an image of a print sample and an image of a reproduced image printed matter in the information processing apparatus according to one embodiment of the present disclosure.

FIG. 12 is a diagram illustrating an example of display operation of a screen for deleting an image of a print sample (a sample image) and an image of a reproduced image printed matter (a reproduced image) in the information processing apparatus according to the present embodiment. A description is given of the display operation for deleting the sample image and the reproduced image on the color sample matching screen 1000 with reference to FIG. 12.

The color sample matching screen 1000 illustrated in part (a) of FIG. 12 is in a state in which the image of the document data is displayed in the document data display field 1101, the sample image is displayed in the print sample display field 1201, and the reproduced image is displayed in the reproduced image display field 1301. In this state, when the user presses the delete button 1206, the display control unit 212 displays a read image discard confirmation dialog box 1700 as illustrated in part (b) of FIG. 12.

The read image discard confirmation dialog box 1700 illustrated in part (b) of FIG. 12 is a dialog box for confirming deletion of the sample image displayed in the print sample display field 1201 (or the reproduced image displayed in the reproduced image display field 1301). The read image discard confirmation dialog box 1700 includes an "OK" button 1701 and a cancel button 1702. The "OK" button 1701 is a button for deleting (hiding) the sample image displayed in the print sample display field 1201 (or the reproduced image displayed in the reproduced image display field 1301). The cancel button 1702 is a button for canceling the deletion of the sample image displayed in the print sample display field 1201 (or the reproduced image displayed in the reproduced image display field 1301) to return to the color sample matching screen 1000 illustrated in part (a) of FIG. 12.

When the user presses the "OK" button 1701, the display control unit 212 deletes (hides) the sample image displayed in the print sample display field 1201 as illustrated in part (c) of FIG. 12. Accordingly, when the image reading device 30 fails in the reading processing, for example, the image reading device 30 executes the reading processing on the print sample upside down or face and back sides in reverse, an improper image of the sample print can be deleted. Then, another image obtained by newly reading the print sample with the image reading device 30 can be displayed.

Deletion (non-display) of the reproduced image displayed in the reproduced image display field 1301 by using the delete button 1306 is also performed in substantially the same manner as the operation performed by using the delete button 1206.

Figure 13:
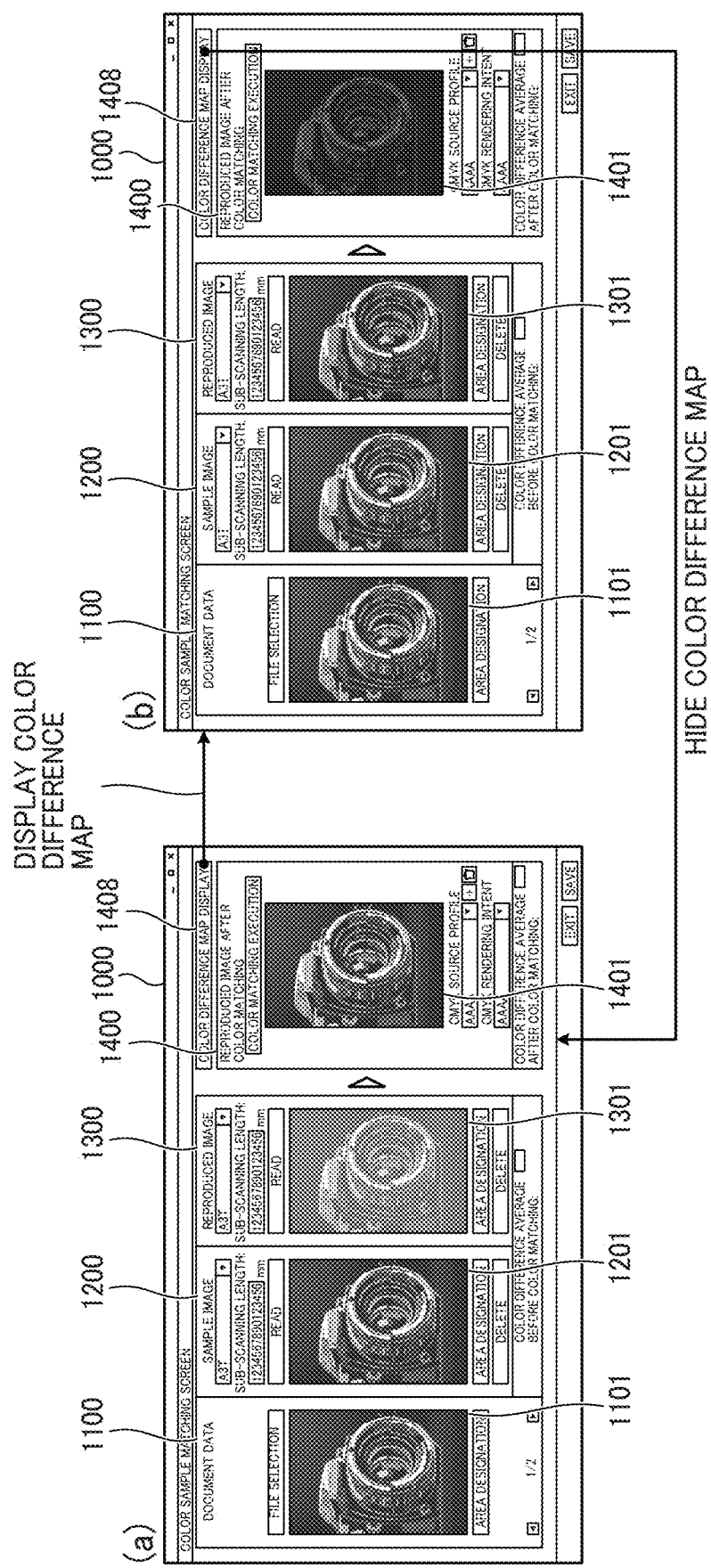
FIG. 13 is a diagram illustrating an example of display operation of a screen for switching between display and non-display of the color difference map in the information processing apparatus according to one embodiment of the present disclosure.

Display Operation of Screen for Switching Between Display and Non-Display of Color Difference Map FIG. 13 is a diagram illustrating an example of display operation of a screen for switching between display and non-display of a color difference map in the information processing apparatus according to the present embodiment. A description is given of the display operation for switching between the display and the non-display of the color difference map on the color sample matching screen 1000 with reference to FIG. 13.

The color sample matching screen 1000 illustrated in part (a) of FIG. 13 is in a state in which the image of the document data is displayed in the document data display field 1101, the sample image is displayed in the print sample display field 1201, the reproduced image is displayed in the reproduced image display field 1301, and the reproduced image after color matching is displayed in the reproduced image after color matching display field 1401. In this state, when the user presses the color difference map display button 1408, the display control unit 212 switches the display of the reproduced image in the reproduced image display field 1301 to the display of the color difference map between the sample image and the reproduced image, and switches the display of the reproduce image after color matching in the reproduced image after color matching display field 1401 to the display of the color difference map between the sample image and the reproduced image after color matching, as illustrated in part (b) of FIG. 13.

When the user presses the color difference map display button 1408 on the color sample matching screen 1000 in the state illustrated in part (b) of FIG. 13, the display control unit 212 switches the display of the color difference map between the sample image and the reproduced image in the reproduced image display field 1301 to the display of the reproduced image, and switches the display of the color difference map between the sample image and the reproduced image after color matching in the reproduced image after color matching display field 1401 to the display of the reproduce image after color matching, as illustrated in part (a) of FIG. 13.

Color Matching Processing to be Executed by Image Forming System

Figure 14:
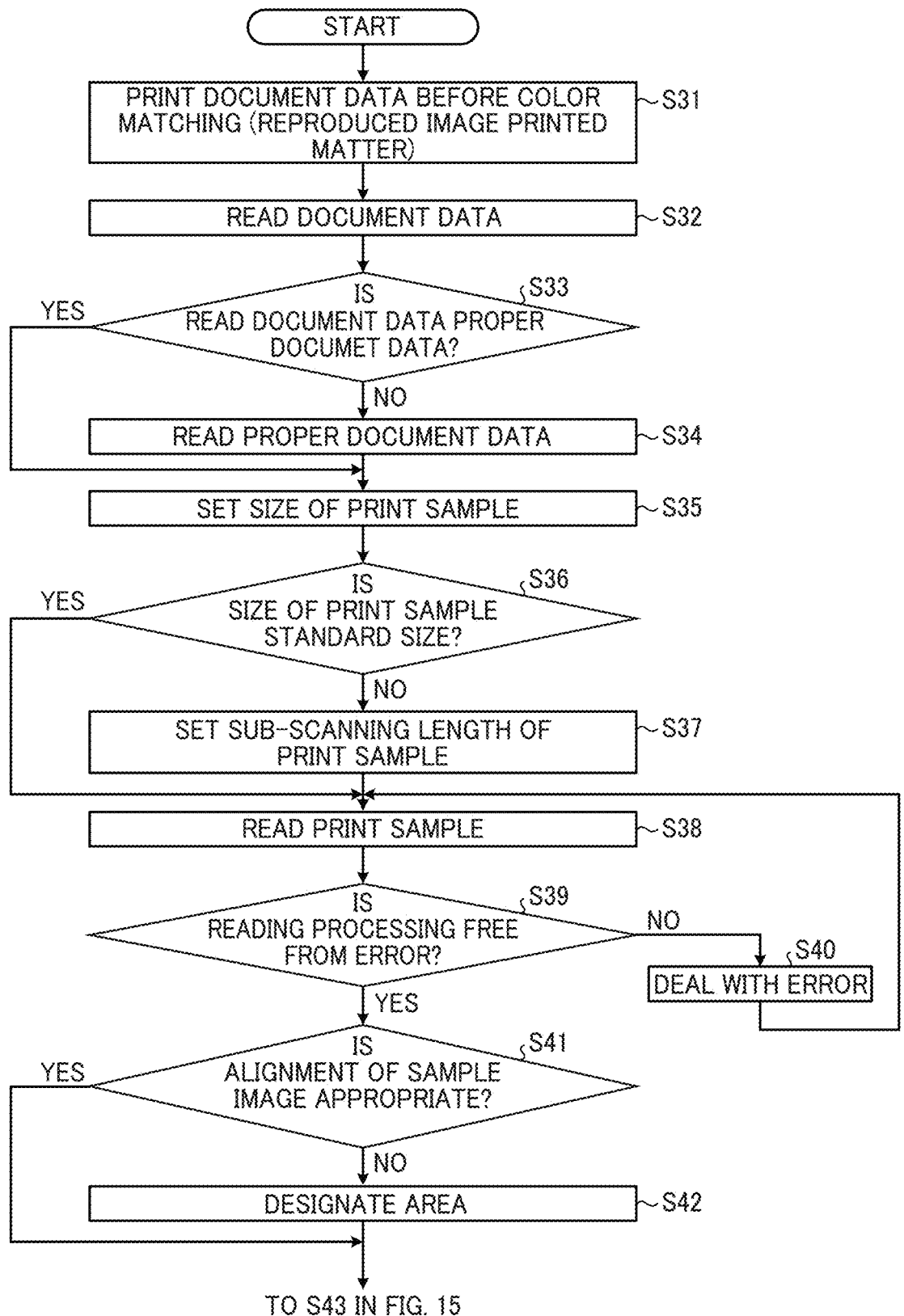
FIG. 14 is a flowchart illustrating an example of color matching processing to be executed by the image forming system according to one embodiment of the present disclosure.
Figure 15:
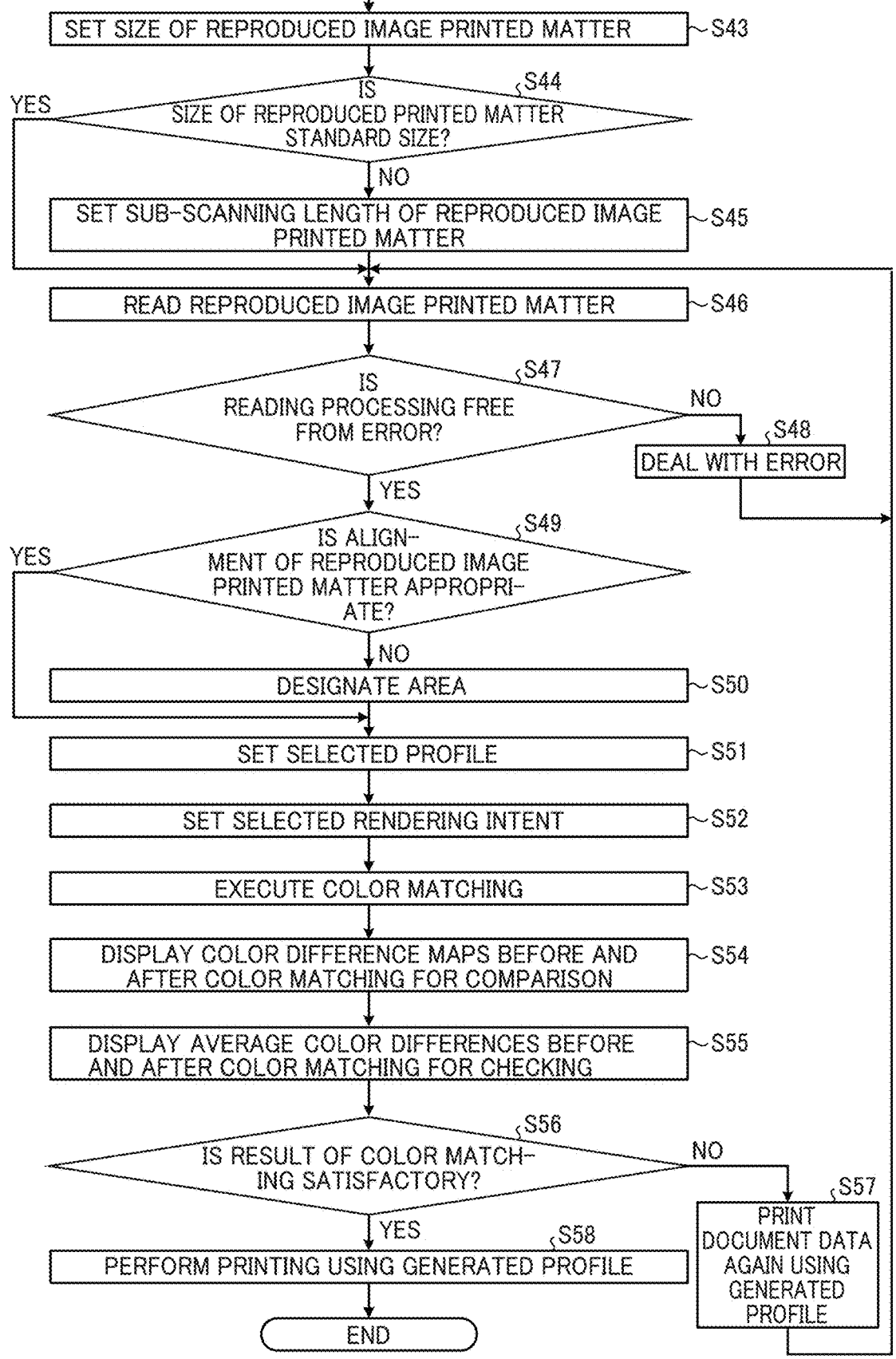
FIG. 15 is a flowchart illustrating an example of color matching processing to be executed by the image forming system according to one embodiment of the present disclosure.

FIGS. 14 and 15 are flowcharts illustrating examples of color matching processing to be executed by the image forming system according to the present embodiment. A description is given of the color matching processing to be executed by the image forming system 1 according to the present embodiment with reference to FIGS. 14 and 15.

Step S31

The user performs, via the control panel 510 of the image forming apparatus 10, an operation for printing out document data subjected to color matching. Accordingly, the job acquisition unit 102 acquires a print job of the document data from the information processing apparatus 20. Alternatively, the job acquisition unit 102 may generate the print job by acquiring the document data stored in the image forming apparatus 10. Then, the print control unit 103 causes the plotter 531 to perform print output of a reproduced image printed matter based on the print job of the document data acquired by the job acquisition unit 102 by applying a profile selected in advance. Then, the processing proceeds to step S32.

Step S32

The user selects the document data subjected to color matching by operating the file selection button 1102 in the document data operation field 1100 on the color sample matching screen 1000. The display control unit 212 reads the document data selected according to the operation of the file selection button 1102 from the storage unit 214 to display the image of the document data in the document data display field 1101. Then, the process proceeds to step S33.

Step S33

When the read document data is determined to be proper document data according to a user operation (step S33: Yes), the process proceeds to step S35. When the read document data is determined not to be proper document data according to a user operation (step S33: No), the process proceeds to step S34.

Step S34

The user again selects document data subjected to color matching by operating the file selection button 1102 in the document data operation field 1100 on the color sample matching screen 1000. The display control unit 212 reads the document data selected according to the operation of the file selection button 1102 from the storage unit 214 to display the image of the document data in the document data display field 1101. Then, the process proceeds to step S35.

Step S35

The user selects a size of the print sample in the size selection field 1204 of the sample image operation field 1200 on the color sample matching screen 1000. The setting unit 203 sets the size according to the user operation. Then, the process proceeds to step S36.

Step S36

When the size of the print sample selected in step S35 is a standard size (step S36: Yes), the process proceeds to step S38. When the size of the print sample selected in step S35 is not a standard size (step S36: No), the process proceeds to step S37.

Step S37

The user inputs the length of the print sample in the sub-scanning direction to the sub-scanning length input field 1205. The setting unit 203 sets the length according to the user operation. Then, the process proceeds to step S38.

Step S38

When the user presses the read button 1202 in the sample image operation field 1200, the communication unit 201 of the information processing apparatus 20 transmits an instruction to read the print sample and the size of the print sample selected in the size selection field 1204 to the image reading device 30. In response to receiving the instruction to read the print sample and the size of the print sample from the information processing apparatus 20, the image reading device 30 executes reading processing on the print sample set on the image reading device 30 according to the selected size of the print sample.

Step S39

When the reading processing executed by the image reading device 30 is determined to be free from an error such as occurrence of a jam or a mistake of reversely reading front and back sides according to a user operation (step S39: Yes), the image reading device 30 transmits the read data of the print sample to the information processing apparatus 20. The communication unit 201 of the information processing apparatus 20 receives the read data of the print sample. The display control unit 212 displays the sample image in the print sample display field 1201 based on the read data of the print sample received by the communication unit 201. Then, the alignment unit 206 performs alignment of the sample image. The process proceeds to step S41.

On the other hand, when the reading processing executed by the image reading device 30 is determined not to be free from an error such as occurrence of a jam or a mistake of reversely reading front and back sides according to a user operation (step S39: No), the process proceeds to step S40.

Step S40

The user deals with the error occurred in the reading processing executed by the image reading device 30. Then, the process returns to step S38.

Step S41

When the information processing apparatus 20 receives a user operation indicating that the alignment of the sample image is appropriately performed by the alignment unit 206 (step S41: Yes), the process proceeds to step S43. When the information processing apparatus 20 receives a user operation indicating that the alignment of the sample image is not appropriately performed by the alignment unit 206 (step S41: No), the process proceeds to step S42.

Step S42

The area designation unit 205 designates an area in the sample image on the area designation screen 1500 for performing alignment of the sample image in accordance with an input to the input unit 211 operated by the user. Then, the alignment unit 206 performs the alignment of the sample image based on the area designated by the area designation unit 205 in the sample image. Then, the process proceeds to step S43.

Step S43

The user selects a size of the reproduced image printed matter in the size selection field 1304 of the reproduced image operation field 1300 on the color sample matching screen 1000. The setting unit 203 sets the size according to the user operation. Then, the process proceeds to step S44.

Step S44

When the size of the reproduced image printed matter selected in step S43 is a standard size (step S44: Yes), the process proceeds to step S46. When the size of reproduced image printed matter selected in step S43 is not a standard size (step S44: No), the process proceeds to step S45.

Step S45

The user inputs the length of the reproduced image printed matter in the sub-scanning direction to the sub-scanning length input field 1305. The setting unit 203 sets the length according to the user operation. Then, the process proceeds to step S46.

Step S46

When the user presses the read button 1302 in the reproduced image operation field 1300, the communication unit 201 of the information processing apparatus 20 transmits an instruction to read the reproduced image printed matter and the size of the reproduced image printed matter selected in the size selection field 1304 to the image reading device 30. In response to receiving the instruction to read the reproduced image printed matter and the size of the reproduced image printed matter from the information processing apparatus 20, the image reading device 30 executes reading processing on the reproduced image printed matter set on the image reading device 30 according to the selected size of the reproduced image printed matter.

Step S47

When the reading processing executed by the image reading device 30 is determined to be free from an error such as occurrence of a jam or a mistake of reversely reading front and back sides according to a user operation (step S47: Yes), the image reading device 30 transmits the read data of the reproduced image printed matter to the information processing apparatus 20. The communication unit 201 of the information processing apparatus 20 receives the read data of the reproduced image printed matter. Then, the display control unit 212 displays the reproduced image in the reproduced image display field 1301 based on the read data of the reproduced image printed matter received by the communication unit 201. Then, the alignment unit 206 aligns both the sample image and the reproduced image so that the color matching can be executed for the color of the reproduced image to be matched with the color of the sample image. The process proceeds to step S49.

On the other hand, when the reading processing executed by the image reading device 30 is determined not to be free from an error such as occurrence of a jam or a mistake of reversely reading front and back sides according to a user operation (step S47: No), the process proceeds to step S48.

Step S48

The user deals with the error occurred in the reading processing executed by the image reading device 30. Then, the process returns to step S46.

Step S49

When the information processing apparatus 20 receives user operation indicating that the alignment of the sample image is appropriately performed by the alignment unit 206 (step S49: Yes), the process proceeds to step S51. When the information processing apparatus 20 receives user operation indicating that the alignment of the reproduced image is not appropriately performed by the alignment unit 206 (step S49: No), the process proceeds to step S50.

Step S50

The area designation unit 205 designates an area in the reproduced image on the area designation screen 1500 for performing alignment of the sample image and the reproduced image in accordance with an input to the input unit 211 operated by the user. Then, the alignment unit 206 aligns both the sample image and the reproduced image based on the area designated by the area designation unit 205 in the reproduced image. Then, the process proceeds to step S51.

Step S51

The setting unit 203 sets, according to a user's selecting operation, a profile to be applied to control of print output of as a reproduced image printed matter in the profile selection field 1402. Then, the process proceeds to step S52.

Step S52

The setting unit 203 sets, according to a user's selecting operation, a rendering intent to be applied to the control of the print output of the reproduced image printed matter in the rendering intent selection field 1403. Then, the process proceeds to step S53.

Step S53

The color matching unit 207 executes color matching for the color of the reproduced image to be matched with the color of the sample image based on the document data. Specifically, the color matching unit 207 generates a profile to be applied to the control of the print output of the document data by adjusting the color of the reproduced image to be matched with the color of the sample image. Then, the process proceeds to step S54.

Step S54

When the user presses the color difference map display button 1408, the color difference calculation unit 208 calculates a color difference between the sample image and the reproduced image after color matching to generate a color difference map. The display control unit 212 switches display of the reproduced image after color matching in the reproduced image after color matching display field 1401 to display of the color difference map between the sample image and the reproduced image after color matching. In addition, the color difference calculation unit 208 calculates a color difference between the sample image and the reproduced image (i.e., the reproduced image before color matching) to generate a color difference map. The display control unit 212 switches display of the reproduced image in the reproduced image display field 1301 to display of the color difference map between the sample image and the reproduced image before color matching. Thus, the user compares the color difference maps before and after color matching. Then, the process proceeds to step S55.

Step S55

Further, the color difference calculation unit 208 calculates an average color difference between the sample image and the reproduced image after color matching. The display control unit 212 displays an average color difference between the sample image and the reproduced image after color matching in the color difference after color matching display field 1407 of the color matching operation field 1400. Furthermore, the color difference calculation unit 208 calculates an average color difference between the sample image and the reproduced image before color matching. The display control unit 212 displays an average color difference between the sample image and the reproduced image before color matching in the color difference before color matching display field 1307 of the reproduced image operation field 1300.

Thus, the user confirms the average color differences before and after color matching. Then, the process proceeds to step S56.

Step S56

When the information processing apparatus 20 receives a user's operation indicating that the result of the color matching is satisfactory (step S56: Yes), the process proceeds to step S58. When the information processing apparatus 20 receives a user's operation indicating that the result of the color matching is not satisfactory (step S56: No), the process proceeds to step S57.

Step S57

The user again performs, via the control panel 510 of the image forming apparatus 10, an operation for printing out document data subjected to color matching. Accordingly, the job acquisition unit 102 acquires a print job of the document data from the information processing apparatus 20. Then, the print control unit 103 again causes the plotter 531 to perform print output of a reproduced image printed matter based on the print job of the document data acquired by the job acquisition unit 102 by applying the profile generated in step 53. Then, the process returns to step S46.

Step S58

When the information processing apparatus 20 receives a user's operation indicating that the result of the color matching is satisfactory, the profile transmission unit 209 transmits the profile generated by the color matching unit 207 to the image forming apparatus 10 via the communication unit 201 in accordance with a user operation. The communication unit 101 of the image forming apparatus 10 receives the profile.

The profile acquisition unit 104 of the image forming apparatus 10 acquires the profile received by the communication unit 101 from the information processing apparatus 20. The profile acquisition unit 104 stores (registers) the acquired profile in the storage unit 105. Then, the profile acquisition unit 104 transmits a notification indicating registration of the profile to the information processing apparatus 20 via the communication unit 101. Thereafter, the image forming apparatus 10 performs printing by applying the registered profile.

As described above, the display control unit 212 of the information processing apparatus 20 according to the present embodiment controls the display 608 to display the document data display field 1101, the print sample display field 1201, the reproduced image display field 1301, and the reproduced image after color matching display field 1401. The document data display field 1101 is a field for displaying the image of the document data. The print sample display field 1201 is a field for displaying the sample image based on the read data of the print sample read by the image reading device 30. The reproduced image display field 1301 is a field for displaying the reproduced image based on the read data generated by the image reading device 30 reading the reproduced image printed matter printed out by the image forming apparatus 10 based on the document data. The reproduced image after color matching display field 1401 is a field for displaying the reproduced image after color matching. The reproduced image after color matching is an image of the reproduced image printed matter for which the color matching has been executed based on the document data so that the color of the reproduced image matches the color of the print sample. As described above, since the sample image, the reproduced image (before color matching), and the reproduced image after color matching are displayed on the same screen, color reproducibility is easily judged. Thus, stable color reproducibility to reproduce the color of the print sample is achieved. In particular, since the display control unit 212 displays the reproduced image display field 1301 and the reproduced image after color matching display field 1401 adjacent to each other, judgement of color reproducibility is facilitated.

Note that, in a case where at least a portion of the functional units of the image forming apparatus 10 and the information processing apparatus 20 according to the above-described embodiment is implemented by execution of a computer program, the program can be prestored in a ROM or the like. The programs to be executed by the image forming apparatus 10 and the information processing apparatus 20 according to the embodiment described above may be configured to be recorded in any computer-readable recording medium, such as a compact disc read only memory (CD-ROM), a flexible disk (FD), a compact disc recordable (CD-R), or a DVD, in an installable or executable file format and provided as computer program products. In addition, the programs to be executed by the image forming apparatus 10 and the information processing apparatus 20 according to the embodiment described above may be configured to be stored in a computer connected to a network such as the Internet and provided by being downloaded via the network. Further, the programs to be executed by the image forming apparatus 10 and the information processing apparatus 20 according to the embodiment described above may be configured to be provided or distributed via a network such as the Internet. The programs to be executed by the image forming apparatus 10 and the information processing apparatus 20 according to the embodiment described above have module structure including at least one of the above-described functional units. Regarding the actual hardware related to the programs, the CPU 501 (CPU 601) reads and executes the programs from the memory (e.g., the system memory 502, the auxiliary memory 508, or the auxiliary memory 605) to load the programs onto the main memory to implement the above-described functional units.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An information processing apparatus comprising:
a display;
circuitry configured to control the display to display:
a first display field for displaying a first image of document data;
a second display field for displaying a second image based on a first data generated by an image reading device reading a print sample;
a third display field for displaying a third image based on a second data generated by the image reading device reading a printed matter printed out by an image forming apparatus based on the document data; and
a fourth display field for displaying a fourth image after execution of color matching for color of the third image to be matched with color of the second image based on the document data;
wherein the circuitry is configured to display the third display field and the fourth display field adjacent to each other.

2. The information processing apparatus according to claim 1, wherein:
the circuitry is configured to display a first operation element for causing the image reading device to read the print sample and a second operation element for causing the image reading device to read the printed matter; and
the circuitry is further configured to cause the image reading device to:
read the print sample in response to an operation to the first operation element; and
read the printed matter in response to an operation to the second operation element.

3. The information processing apparatus according to claim 1, wherein:
the circuitry is configured to:
display a third operation element for switching display of the third image in the third display field and display of the fourth image in the fourth display field; and
in response to an operation to the third operation element, switch the third image displayed in the third display field to a first color difference image representing a color difference between the second image and the third image and switches the fourth image displayed in the fourth display field to a second color difference image representing a color difference between the second image and the fourth image.

4. The information processing apparatus according to claim 1, wherein:
the circuitry is further configured to:
designate an area in each of the second image and the third image in accordance with an input operation to the display; and
align the second image and the third image so that the color matching is executed based on the designated area in each of the second image and the third image.

5. The information processing apparatus according to claim 1, wherein:
the circuitry is further configured to execute the color matching for the color of the third image to be matched with the color of the second image to generate a profile to be applied to control of print output of the document data.

6. An image forming system comprising:
the image reading device;
the image forming apparatus; and
the information processing apparatus according to claim 1.

7. A method for controlling a display, comprising:
displaying a first image of document data in a first display field;
displaying a second image in a second display field based on a first data generated by an image reading device reading a print sample;
displaying a third image in a third display field based on a second data generated by the image reading device reading a printed matter printed out by an image forming apparatus based on the document data; and
displaying a fourth image after execution of color matching for color of the third image to be matched with color of the second image based on the document data in a fourth display field;
wherein the third display field and the fourth display field are displayed adjacent to each other.

8. A non-transitory recording medium carrying computer readable codes for controlling a computer system to perform a method, the method comprising:
displaying a first image of document data in a first display field;
displaying a second image in a second display field based on a first data generated by an image reading device reading a print sample;
displaying a third image in a third display field based on a second data generated by the image reading device reading a printed matter printed out by an image forming apparatus based on the document data; and
displaying a fourth image after execution of color matching for color of the third image to be matched with color of the second image based on the document data in a fourth display field;
wherein the third display field and the fourth display field are displayed adjacent to each other.

* * * * *